United States Patent
Mori et al.

(10) Patent No.: US 12,372,976 B2
(45) Date of Patent: Jul. 29, 2025

(54) AUTOMATIC LANDING SYSTEM FOR VERTICAL TAKE-OFF AND LANDING AIRCRAFT, VERTICAL TAKE-OFF AND LANDING AIRCRAFT, AND LANDING CONTROL METHOD FOR VERTICAL TAKE-OFF AND LANDING AIRCRAFT

(71) Applicant: MITSUBISHI HEAVY INDUSTRIES, LTD., Tokyo (JP)

(72) Inventors: Satoshi Mori, Tokyo (JP); Toru Kojima, Tokyo (JP); Katsumi Takagi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/036,773

(22) PCT Filed: Jan. 13, 2022

(86) PCT No.: PCT/IB2022/050229
§ 371 (c)(1),
(2) Date: May 12, 2023

(87) PCT Pub. No.: WO2022/101892
PCT Pub. Date: May 19, 2022

(65) Prior Publication Data
US 2023/0418310 A1    Dec. 28, 2023

(30) Foreign Application Priority Data
Nov. 13, 2020 (JP) .................. 2020-189569

(51) Int. Cl.
*G05D 1/00* (2024.01)
*B64C 27/04* (2006.01)
(Continued)

(52) U.S. Cl.
CPC .............. *G05D 1/102* (2013.01); *B64D 45/08* (2013.01); *B64F 1/18* (2013.01); *B64U 70/80* (2023.01); *B64C 27/04* (2013.01); *B64U 2101/30* (2023.01)

(58) Field of Classification Search
CPC ................ B64C 39/024; G06K 7/1426; G06K 19/06037; G08G 5/025; G08G 5/74;
(Continued)

(56) References Cited

U.S. PATENT DOCUMENTS

| 8,626,364 B2 | 1/2014 | Moresve |
| 8,630,755 B2 | 1/2014 | Ohtomo et al. |

(Continued)

FOREIGN PATENT DOCUMENTS

| CN | 104932522 | 4/2018 | |
| CN | 106125765 B | * 1/2019 | ............. G05D 1/101 |

(Continued)

OTHER PUBLICATIONS

International Search Report issued Mar. 22, 2022 in corresponding International (PCT) Patent Application No. PCT/IB2022/050229, with English language translation.

(Continued)

*Primary Examiner* — Yuri Kan
(74) *Attorney, Agent, or Firm* — Wenderoth, Lind & Ponack, L.L.P.

(57) ABSTRACT

An automatic landing system for a vertical take-off and landing aircraft includes: a camera mounted on a vertical take-off and landing aircraft; a relative-position acquisition unit configured to perform image processing on an image captured by the camera, the image including a marker group provided at a target landing point, to acquire a relative position between the vertical take-off and landing aircraft and the target landing point; and a control unit configured to (Continued)

control the vertical take-off and landing aircraft such that the relative position becomes zero, in which the marker group includes a plurality of markers that are arranged side by side and that have different center positions from each other, the markers are larger as arranged farther away from the target landing point, and the relative-position acquisition unit acquires the relative position based on a distance between the marker recognized in the image and the target landing point.

7 Claims, 18 Drawing Sheets

(51) Int. Cl.
    *B64D 45/08*     (2006.01)
    *B64F 1/18*     (2006.01)
    *B64U 70/80*     (2023.01)
    *B64U 101/30*     (2023.01)

(58) Field of Classification Search
    CPC ........ H04N 23/54; B64U 50/19; B64U 10/17; B64D 45/08; G06T 7/73; G05D 1/101
    See application file for complete search history.

(56) References Cited

U.S. PATENT DOCUMENTS

| | | | |
|---|---|---|---|
| 2005/0125142 A1 | 6/2005 | Yamane | |
| 2012/0078451 A1 | 3/2012 | Ohtomo et al. | |
| 2012/0277934 A1 | 11/2012 | Ohtomo et al. | |
| 2014/0316608 A1* | 10/2014 | Alber | B64U 10/17 701/2 |
| 2016/0031559 A1 | 2/2016 | Zang | |
| 2016/0122038 A1* | 5/2016 | Fleischman | G06T 7/73 244/114 R |
| 2016/0124431 A1* | 5/2016 | Kelso | G06K 7/1426 701/28 |
| 2017/0001732 A1 | 1/2017 | Lim | |
| 2017/0045894 A1 | 2/2017 | Canoy et al. | |
| 2017/0197710 A1 | 7/2017 | Ma | |
| 2017/0225800 A1 | 8/2017 | Holt et al. | |
| 2018/0224868 A1 | 8/2018 | Lim | |
| 2018/0293902 A1 | 10/2018 | Liberman et al. | |
| 2018/0364740 A1 | 12/2018 | Collins et al. | |
| 2019/0227572 A1 | 7/2019 | Blonder et al. | |
| 2019/0227573 A1* | 7/2019 | Addonisio | B64D 45/08 |
| 2019/0310658 A1 | 10/2019 | Zhu | |
| 2019/0369645 A1 | 12/2019 | Worsham, II et al. | |
| 2020/0026309 A1 | 1/2020 | Ma | |
| 2020/0130864 A1* | 4/2020 | Brockers | B64U 50/19 |
| 2020/0301445 A1* | 9/2020 | Jourdan | G06K 19/06037 |
| 2020/0401163 A1* | 12/2020 | Inoshita | H04N 23/54 |
| 2021/0011495 A1 | 1/2021 | Inoshita | |
| 2021/0031945 A1* | 2/2021 | Inoshita | G05D 1/101 |
| 2021/0362875 A1 | 11/2021 | Yi et al. | |
| 2022/0091607 A1 | 3/2022 | Zang | |
| 2023/0027342 A1* | 1/2023 | Kojima | G08G 5/025 |

FOREIGN PATENT DOCUMENTS

| | | |
|---|---|---|
| DE | 10 2009 060 901 | 7/2011 |
| JP | 2012-71645 | 4/2012 |
| JP | 2017-503226 | 1/2017 |
| JP | 2017-534869 | 11/2017 |
| JP | 2018-510425 | 4/2018 |
| JP | 2018-129063 | 8/2018 |
| WO | 2016/154945 | 10/2016 |
| WO | 2018/064657 | 4/2018 |
| WO | 2019/175992 | 9/2019 |
| WO | 2019/175993 | 9/2019 |
| WO | 2019/175994 | 9/2019 |
| WO | 2021/070517 | 4/2021 |

OTHER PUBLICATIONS

Written Opinion issued Mar. 22, 2022 in corresponding International (PCT) Patent Application No. PCT/IB2022/050229, with English language translation.
Extended European Search Report issued Dec. 8, 2023 in corresponding European Patent Application No. 22723002.6.
Hao Zhou et al., "Vision-based Precision Localization of UAVs for Sensor Payload Placement and Pickup for Field Monitoring Applications", Sensors and Smart Structures Technologies for Civil, Mechanical, and Aerospace Systems, 2019.
Office Action issued Apr. 12, 2024 in U.S. Appl. No. 17/767,167.
Office Action issued Feb. 6, 2024 in Singaporean Patent Application No. 11202203558V.
Office Action issued Sep. 24, 2024 in U.S. Appl. No. 17/767,167.
Written Opinion Of The International Searching Authority issued Nov. 2, 2020 in International (PCT) Application No. PCT/JP2020/033016, with English language Translation.
Office Action issued Mar. 17, 2025 in U.S. Appl. No. 17/767,167.
Extended European Search Report issued Sep. 15, 2022 in European Patent Application No. 20873949.0.
International Search Report issued Nov. 2, 2020 in International (PCT) Application No. PCT/JP2020/033016, with English language Translation.

* cited by examiner

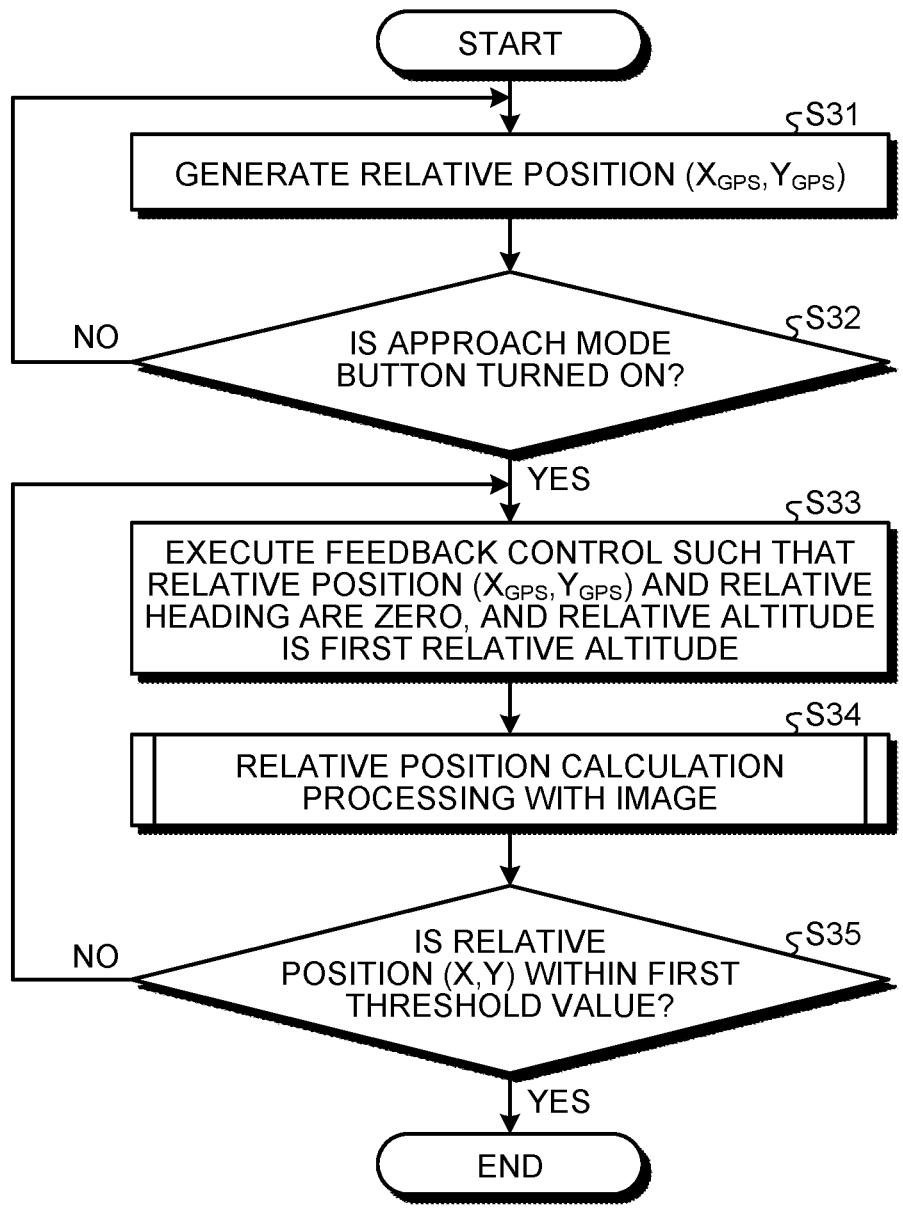

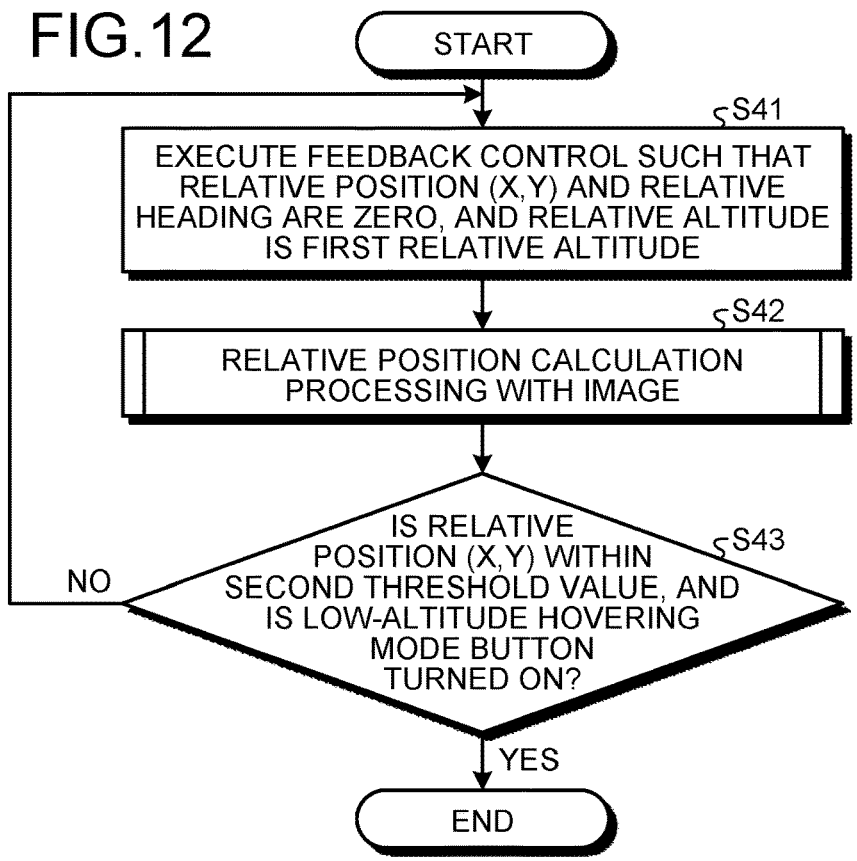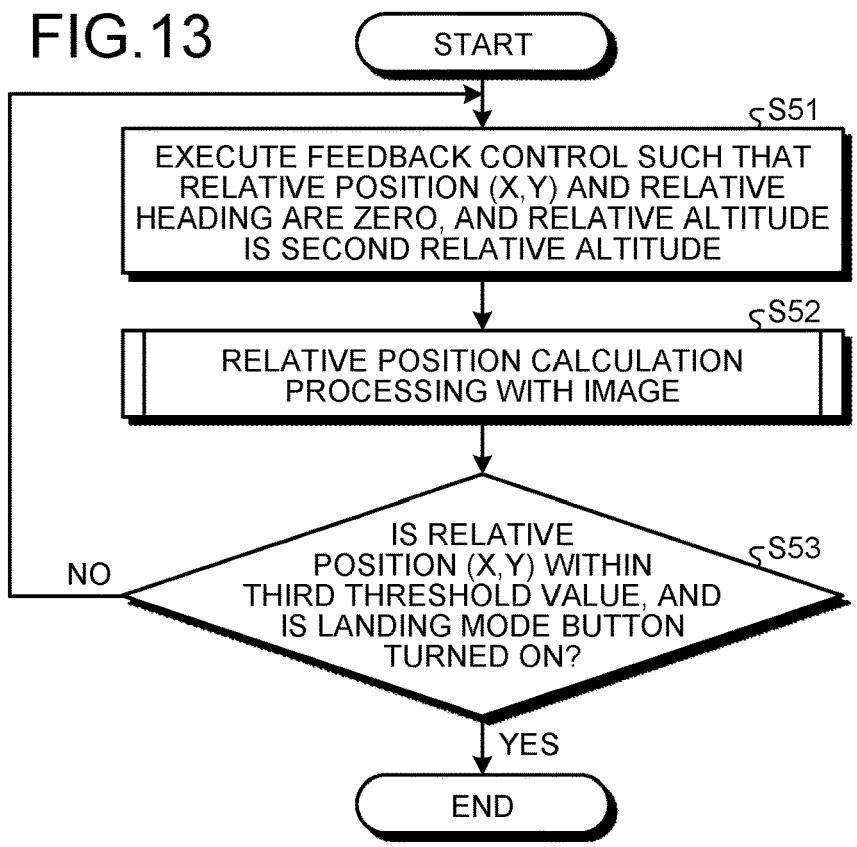

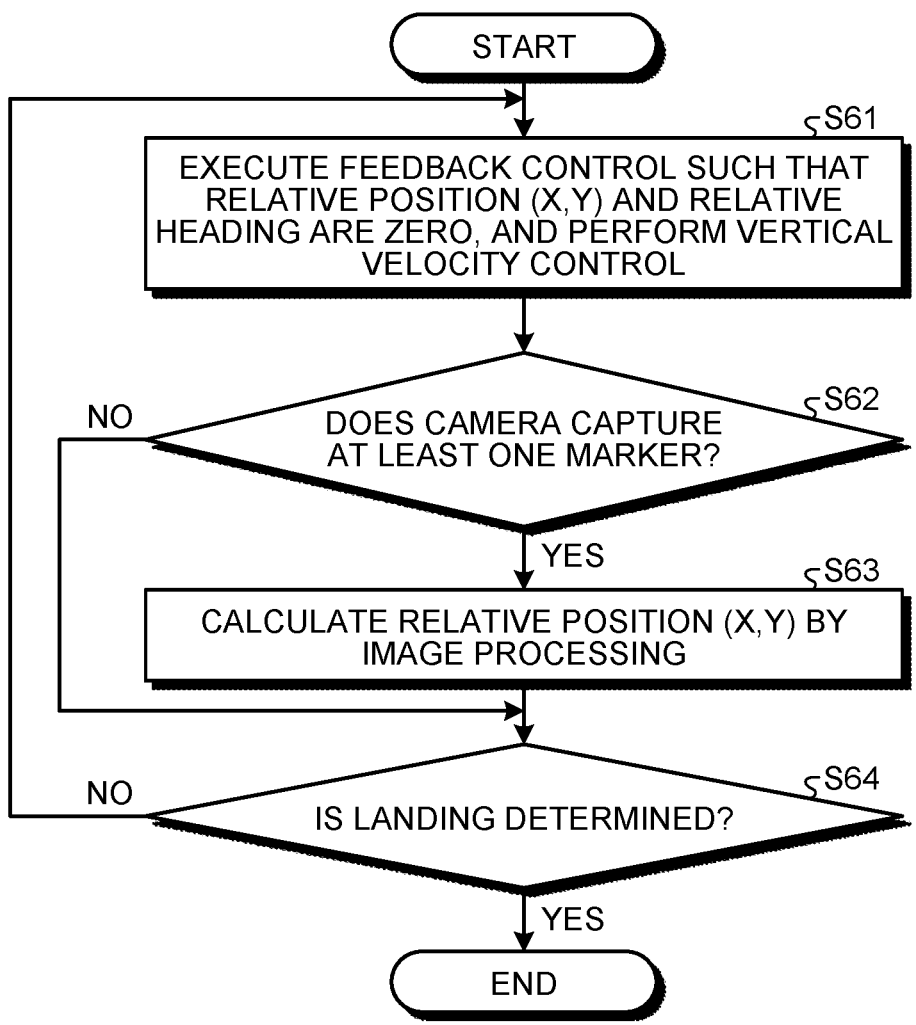

FIG.19
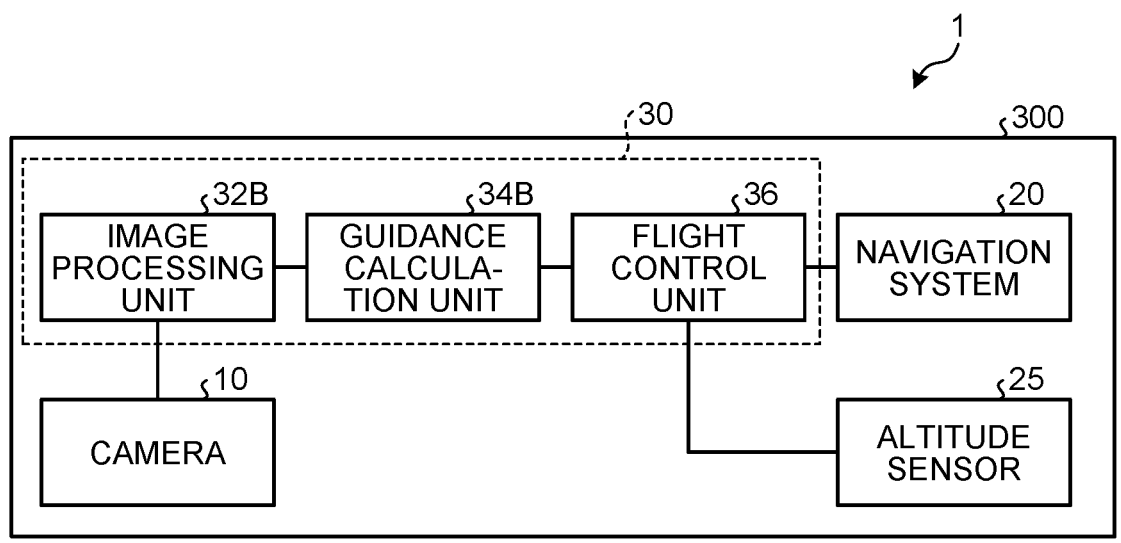
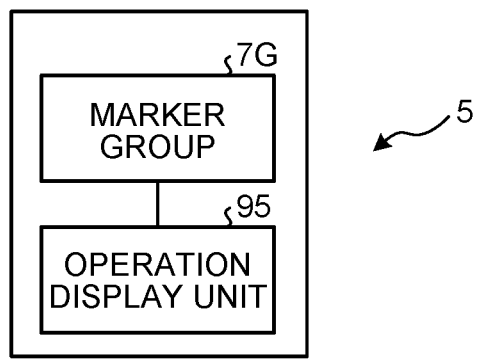

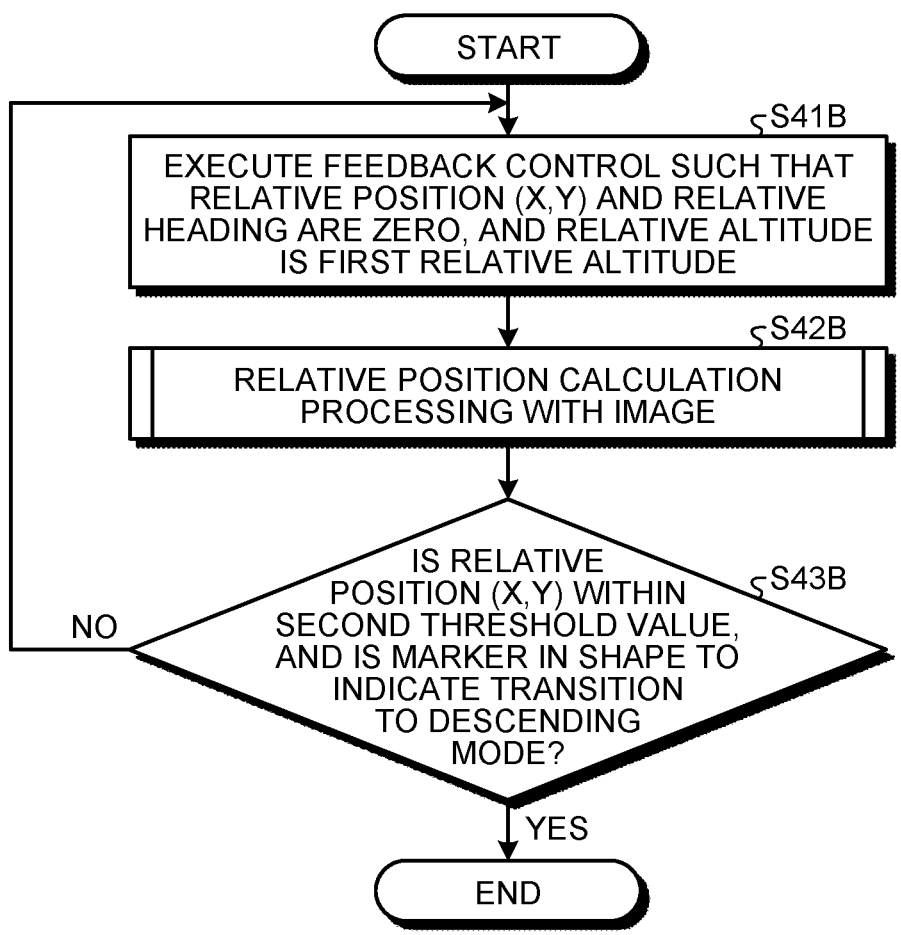

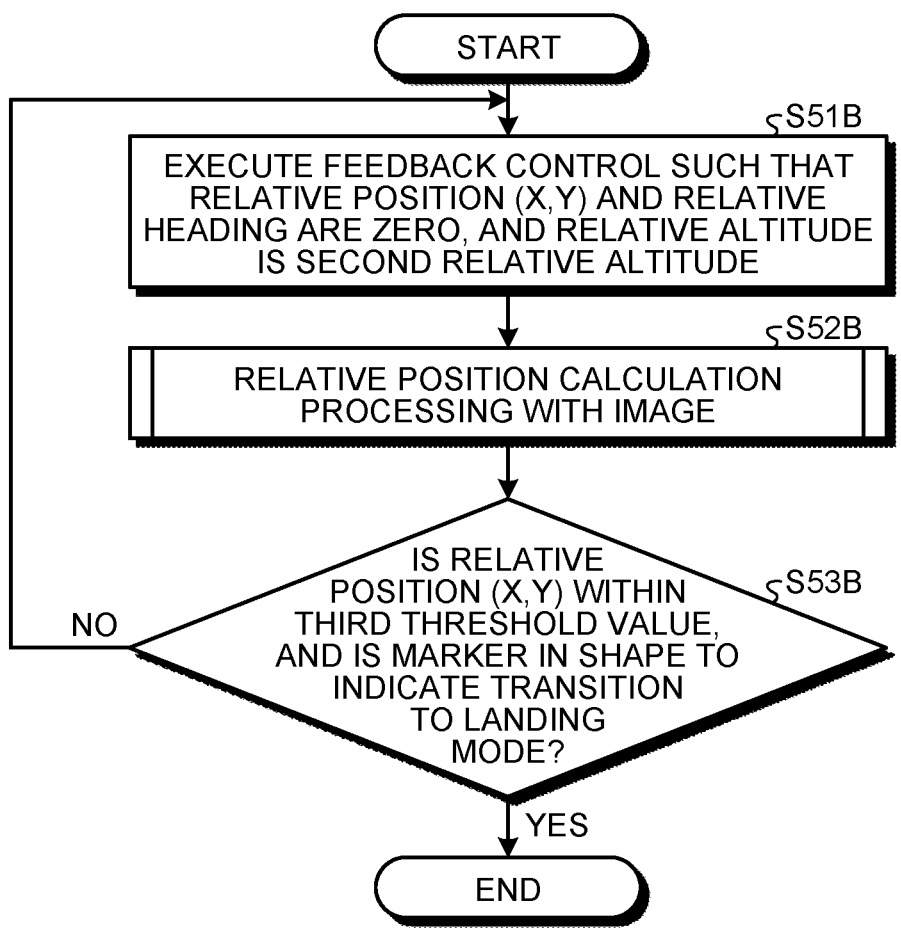

AUTOMATIC LANDING SYSTEM FOR VERTICAL TAKE-OFF AND LANDING AIRCRAFT, VERTICAL TAKE-OFF AND LANDING AIRCRAFT, AND LANDING CONTROL METHOD FOR VERTICAL TAKE-OFF AND LANDING AIRCRAFT

FIELD

The present invention relates to an automatic landing system for a vertical take-off and landing aircraft, a vertical take-off and landing aircraft, and a landing control method for a vertical take-off and landing aircraft.

BACKGROUND

In the related art, technologies for guiding a vertical take-off and landing aircraft to a target landing point have been known. For example, it is disclosed in Patent Literature 1 that an automatic take-off and landing system calculates a positional relation between a take-off and landing target and a flying object based on images of the take-off and landing target acquired by an imaging device mounted on the flying object, and controls take-off and landing operations of the flying object based on a result of the calculation.

CITATION LIST

Patent Literature

Patent Literature 1: Japanese Patent Application Laid-open No. 2012-071645

SUMMARY

Technical Problem

In the automatic take-off and landing system described in Patent Literature 1, the take-off and landing target is formed in a figure (circular, rectangular, triangular, or other figures) to be disposed at concentric multiple positions. Here, for example, in a case in which the target landing point is located on a moving object such as a marine vessel, the moving object may rock, or a windblast (gust) may occur around the vertical take-off and landing aircraft. In such cases, the disturbance may cause the take-off and landing target to deviate from an imaging range of the imaging device mounted on the vertical take-off and landing aircraft. Furthermore, in a case in which the altitude of the vertical take-off and landing aircraft is relatively far from the take-off and landing target, the take-off and landing target may appear small in the image and may not be recognized in image processing. These factors may prevent the vertical take-off and landing aircraft from being stably guided to the target landing point.

The present invention is made in view of the above circumstance, and an object of the present invention is to provide guiding the vertical take-off and landing aircraft more accurately and stably to the target landing point.

Solution to Problem

To solve the above problems and achieve the object, an automatic landing system for a vertical take-off and landing aircraft according to the present invention includes: an imaging device that is mounted on the vertical take-off and landing aircraft; a relative-position acquisition unit that performs image processing on an image captured by the imaging device, the image including a marker group provided at a target landing point, to acquire a relative position between the vertical take-off and landing aircraft and the target landing point; and a control unit that controls the vertical take-off and landing aircraft so that the relative position becomes zero. The marker group includes a plurality of markers that are arranged side by side and that have different center positions from each other. The markers are larger as arranged farther away from the target landing point. The relative-position acquisition unit acquires the relative position based on a distance between the marker recognized in the image and the target landing point.

To solve the above problems and achieve the object, a vertical take-off and landing aircraft according to the present invention includes the above-described automatic landing system for a vertical take-off and landing aircraft.

To solve the above problems and achieve the object, a landing control method for a vertical take-off and landing aircraft includes the steps of: performing image processing on an image captured by an imaging device that is mounted on a vertical take-off and landing aircraft, the image including a marker group provided at a target landing point, to acquire a relative position between the vertical take-off and landing aircraft and the target landing point; and controlling the vertical take-off and landing aircraft such that the relative position becomes zero. The marker group includes a plurality of markers that are arranged side by side and that have different center positions from each other. The markers are larger as arranged farther away from the target landing point. The step of acquiring the relative position includes acquiring the relative position based on a distance between the marker recognized in the image and the target landing point.

Advantageous Effects of Invention

By the automatic landing system for a vertical take-off and landing aircraft, the vertical take-off and landing aircraft, and the landing control method for a vertical take-off and landing aircraft according to the present invention, an effect that enables more accurate and stable guidance for the vertical take-off and landing aircraft to the target landing point is obtained.

BRIEF DESCRIPTION OF DRAWINGS

FIG. 11 is a flowchart illustrating an example of a processing procedure in an approach mode.

FIG. 12 is a flowchart illustrating an example of a processing procedure in a high-altitude hovering mode.

FIG. 13 is a flowchart illustrating an example of a processing procedure in a low-altitude hovering mode.

FIG. 14 is a flowchart illustrating an example of a processing procedure in a landing mode.

FIG. 19 is a schematic configuration diagram illustrating an automatic landing system according to a third embodiment.

FIG. 20 is a flowchart illustrating an example of a processing procedure of a high-altitude hovering mode in the third embodiment.

FIG. 21 is a flowchart illustrating an example of a processing procedure of a low-altitude hovering mode in the third embodiment.

DESCRIPTION OF EMBODIMENTS

Hereinbelow, a detailed description of embodiments of an automatic landing system for a vertical take-off and landing aircraft, a vertical take-off and landing aircraft, and a landing control method for a vertical take-off and landing aircraft according to the present invention will be described based on the drawings. The present invention is not limited to these embodiments.

First Embodiment

Figure 1:
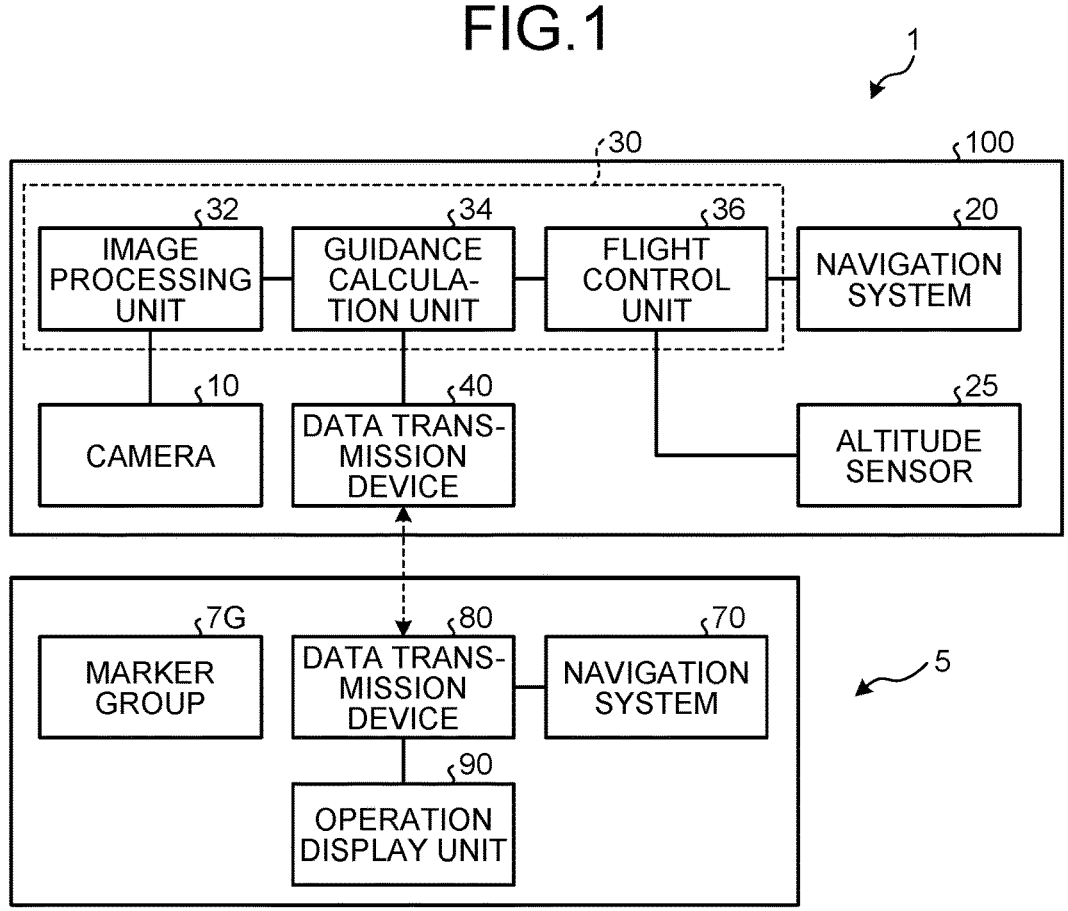
FIG. 1 is a schematic configuration diagram illustrating an example of an automatic landing system for a vertical take-off and landing aircraft according to a first embodiment.
Figure 2:
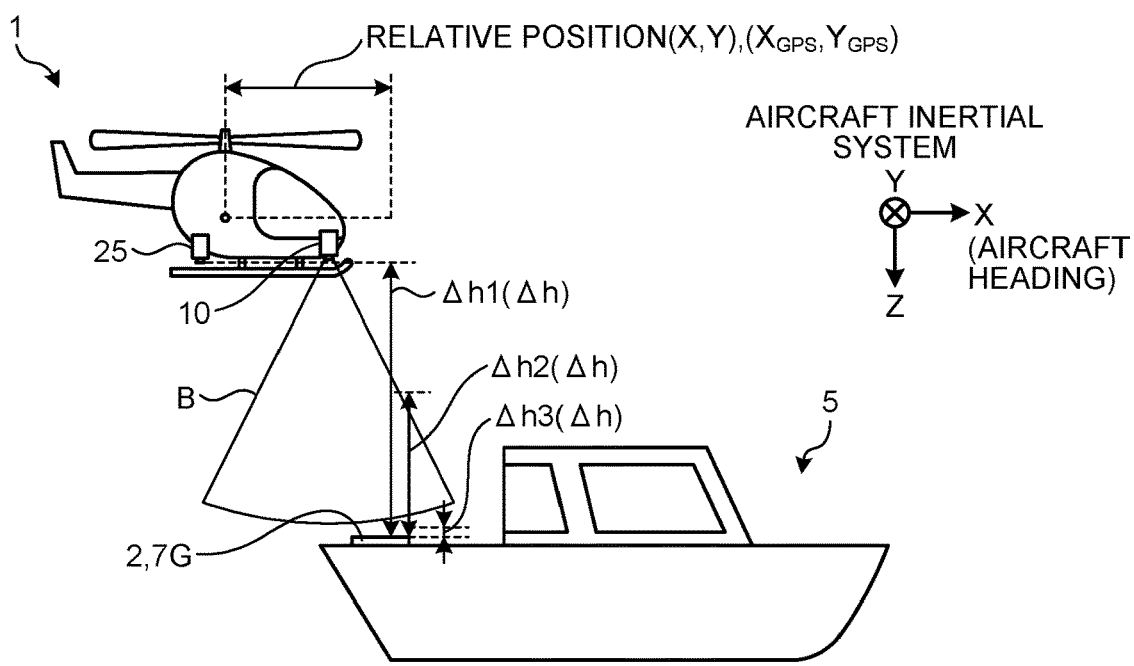
FIG. 2 is an explanatory diagram illustrating a state of the vertical take-off and landing aircraft traveling toward a target landing point according to the first embodiment.

FIG. 1 is a schematic configuration diagram illustrating an example of an automatic landing system for a vertical take-off and landing aircraft according to a first embodiment, and FIG. 2 is an explanatory diagram illustrating a state of the vertical take-off and landing aircraft traveling toward a target landing point according to the first embodiment. A vertical take-off and landing aircraft 1 according to a first embodiment is a flying object (for example, a helicopter, a drone, or other flying objects) that serves as a rotorcraft. In the present embodiment, the vertical take-off and landing aircraft 1 is an unmanned aircraft. The vertical take-off and landing aircraft 1 may be a flying object capable of traveling forward, traveling backward, traveling laterally, turning, and hovering, or may be a manned aircraft. In addition, in a case in which the vertical take-off and landing aircraft 1 is an unmanned aircraft, and remote manual control is performed while flight of the unmanned aircraft is controlled by automatic pilot, flight control based on the remote manual control is prioritized. Similarly, in a case in which the vertical take-off and landing aircraft 1 is a manned aircraft, and manual control is performed while flight of the manned aircraft is controlled by automatic pilot, flight control based on the manual control is prioritized. In the present embodiment, this vertical take-off and landing aircraft 1 is equipped with an automatic landing system 100, its flight is controlled by the automatic landing system 100, and the vertical take-off and landing aircraft 1 lands on a target landing point 2 illustrated in FIG. 2.

Target Landing Point

In the present embodiment, the target landing point 2 is provided on a marine vessel 5, as illustrated in FIG. 2. Thus, the vertical take-off and landing aircraft 1 lands on the marine vessel 5 serving as a moving object that moves on water. However, the target landing point 2 is not limited to the marine vessel 5, and may be provided on a vehicle or the like serving as a moving object that moves on the ground, may be provided on a facility that does not move, or may be provided on the ground. The marine vessel 5 includes a mechanism (not illustrated) for securing the vertical take-off and landing aircraft 1 in a case in which the vertical take-off and landing aircraft 1 lands on the target landing point 2.

Coordinate System

Figure 3:
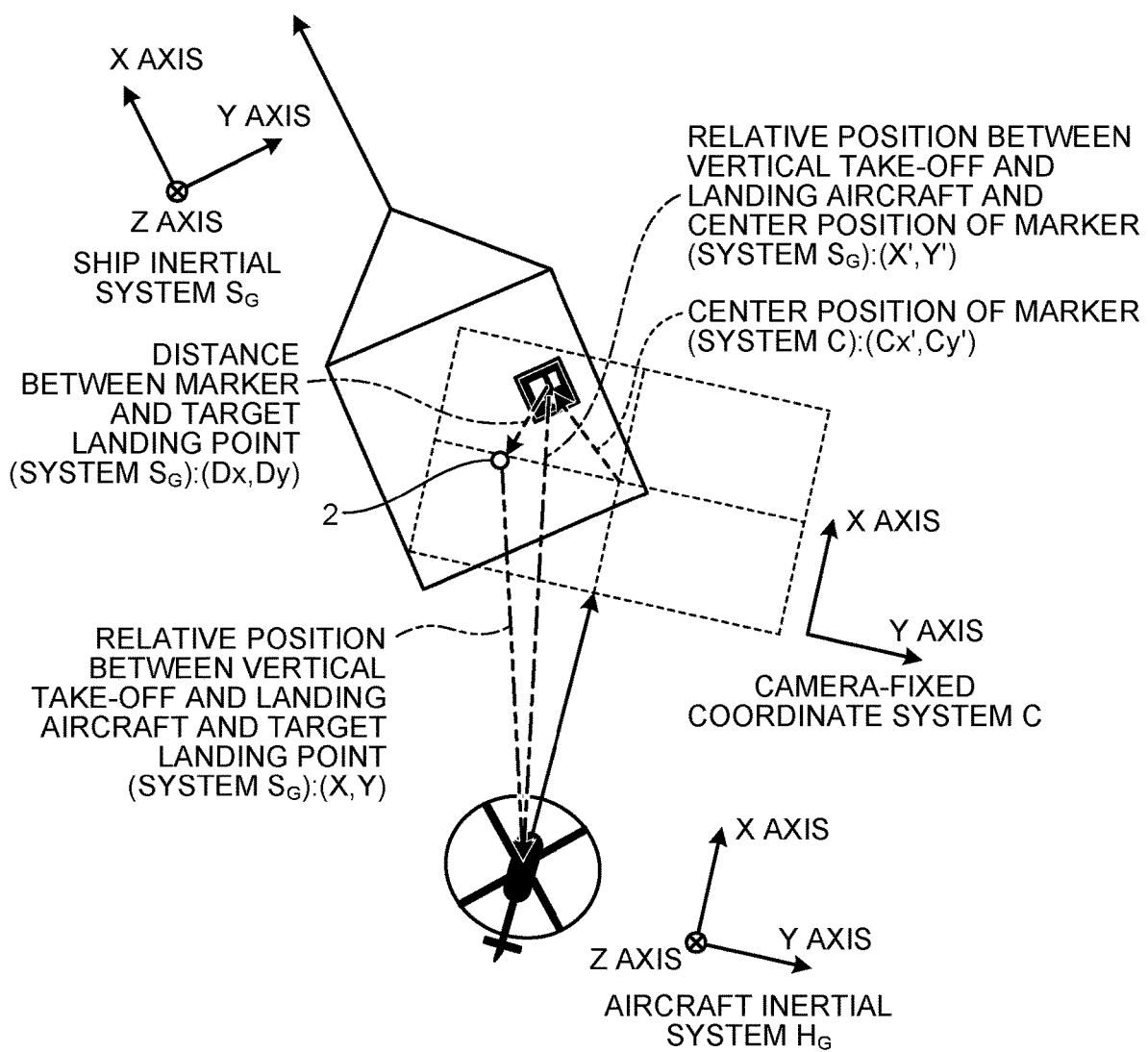
FIG. 3 is an explanatory diagram illustrating each of coordinate systems of the automatic landing system.

Coordinate systems used in the present embodiment is as illustrated in FIG. 3. FIG. 3 is an explanatory diagram illustrating each of the coordinate systems of the automatic landing system. In the automatic landing system 100, a ship inertial system Sc, which is a coordinate system in the marine vessel 5, an aircraft inertial system $H_G$, which is a coordinate system in the vertical take-off and landing aircraft 1, and a camera-fixed coordinate system C, which is a coordinate system in a camera 10 that is provided in the vertical take-off and landing aircraft 1 and described later, are used. Each of the ship inertial system Sc and the aircraft inertial system $H_G$ is a three-dimensional Cartesian coordinate system consisting of X, Y, and Z axes. The camera-fixed coordinate system C is a two-dimensional Cartesian coordinate system consisting of X and Y axes. In the ship inertial system $S_G$, the aircraft body is controlled based on the center position of the target landing point 2 (Sx, Sy). In the aircraft inertial system $H_G$, the aircraft body is controlled based on a position of the vertical take-off and landing aircraft 1 as the origin.

Marker Group

Figure 4:
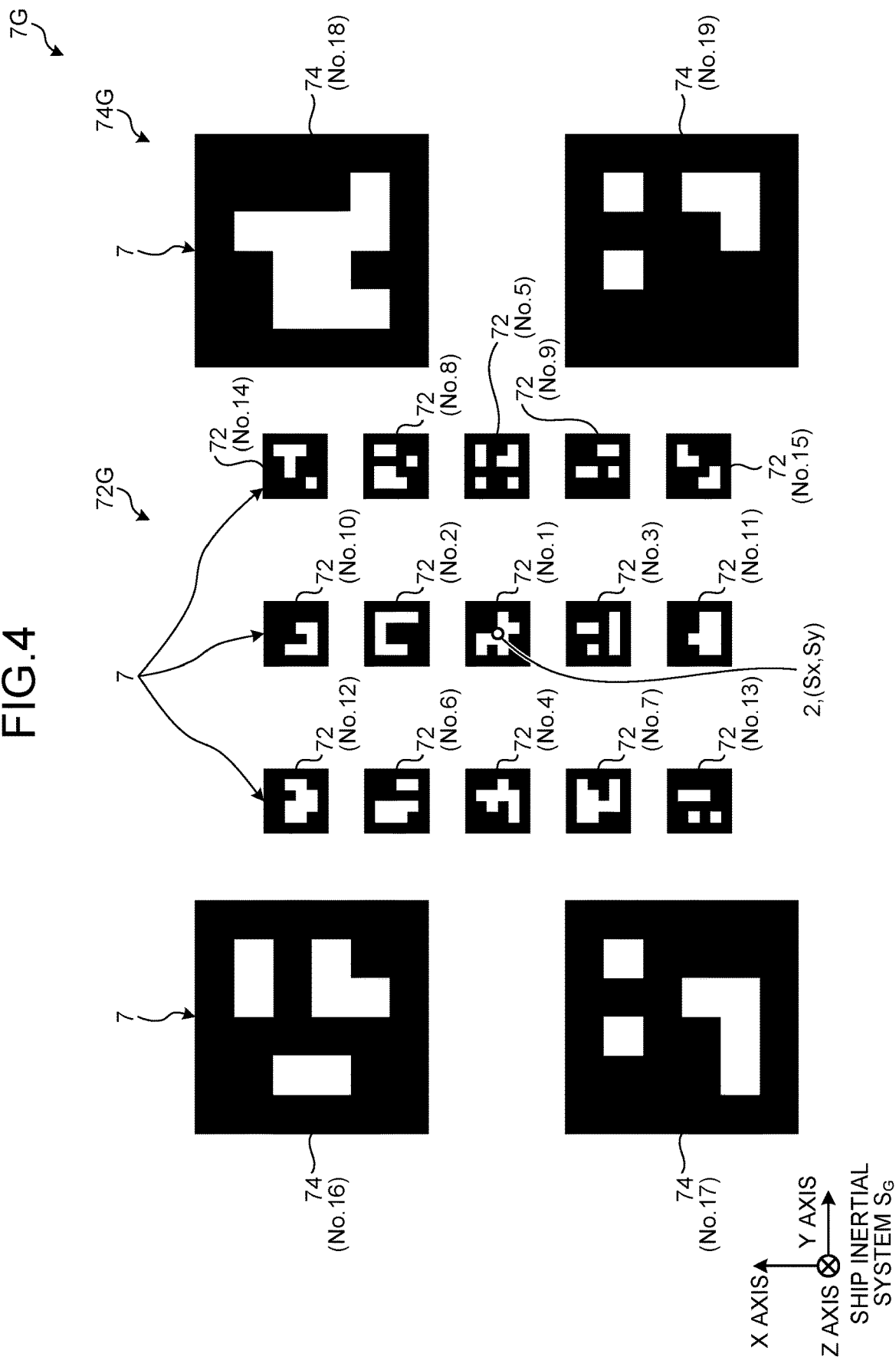
FIG. 4 is an explanatory diagram illustrating an example of a marker group.
Figure 5:
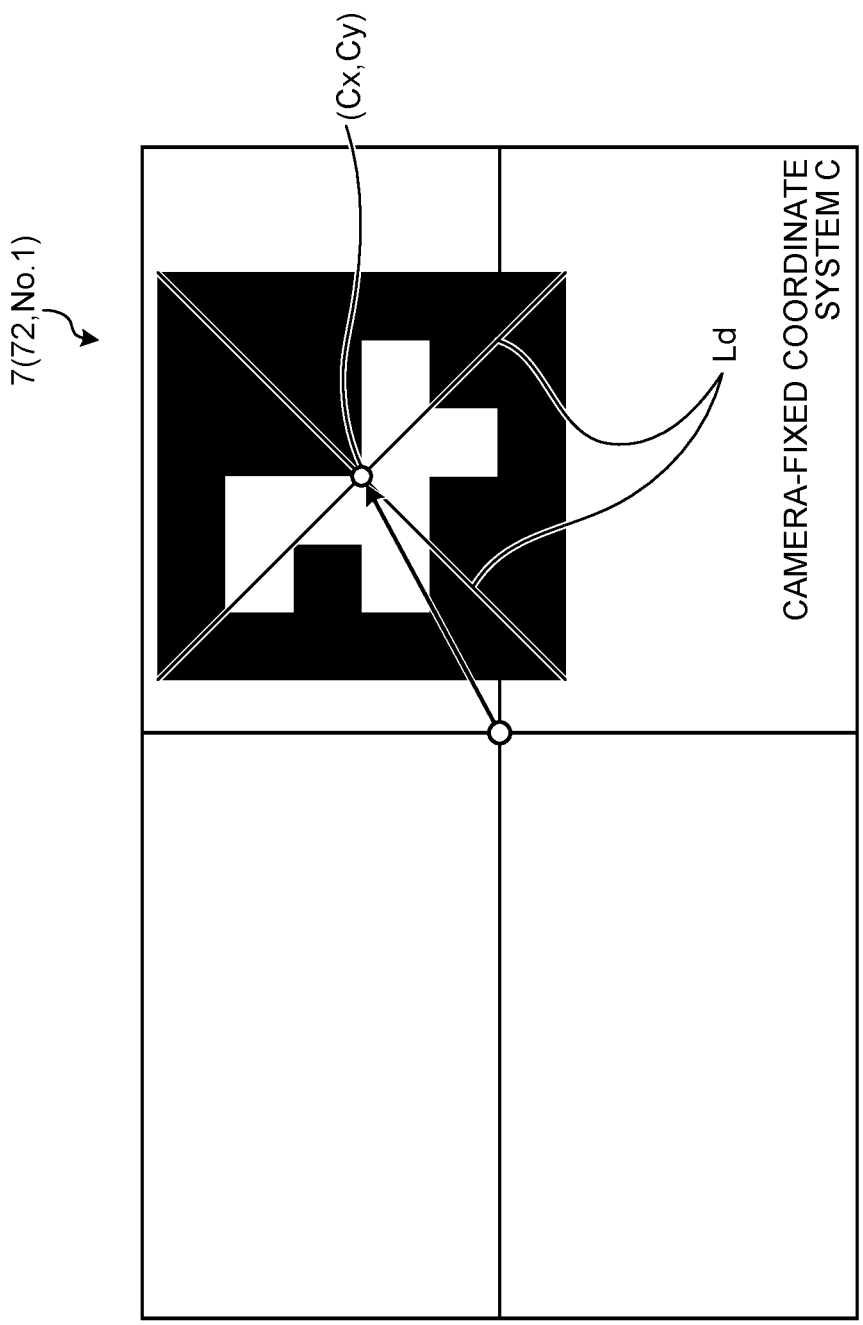
FIG. 5 is an explanatory diagram illustrating an example of a marker included in the marker group.

At the target landing point 2, a marker group 7G is provided for the vertical take-off and landing aircraft 1 to capture a position of the target landing point 2. FIG. 4 is an explanatory diagram illustrating an example of the marker group. FIG. 5 is an explanatory diagram illustrating an example of a marker included in the marker group. In FIG. 4, a position of the marker group 7G is illustrated by the ship inertial system $S_G$. In FIG. 5, a position of a marker is illustrated by the camera-fixed coordinate system C. The marker group 7G includes a plurality of markers 7. As illustrated in FIG. 4, each of the markers 7 in the present embodiment is an AR marker that is made up of two colors of black and white and is a square marker. The marker 7 is not limited to the AR marker, and may be any marker that enables acquisition of information for capturing a position of the target landing point 2 through image processing. Furthermore, a plurality of the marker groups 7G may be provided on the marine vessel 5, and the vertical take-off and landing aircraft 1 may be guided to the target landing point 2 corresponding to any different marker group 7G.

In the present embodiment, the marker group 7G is composed of the markers 7. More specifically, the marker group 7G includes a small marker group 72G and a large marker group 74G, as illustrated in FIG. 4.

Small Marker

The small marker group 72G includes a small marker 72 (for example, No. 1) at the target landing point 2 and a plurality of small markers 72 around the target landing point 2. The small markers 72 are arranged side by side such that center positions thereof are different from each other. The small marker 72, which is No. 1, is arranged such that a center position thereof coincides with a center position of the target landing point 2 (Sx, Sy). By contrast, the small markers 72 other than No. 1 are arranged such that the center positions thereof are shifted from the target landing point 2. In the small marker group 72G, the small markers 72 are arranged in a matrix form. In FIG. 3, an example of the small markers 72 arranged in five rows and three columns is illustrated, but the number of rows and the number of columns are not particularly limited thereto. In addition, the small markers 72 need not be arranged in the matrix form, but may be arranged to be scattered around the target landing point 2. In other words, a distance between adjacent small markers 72 need not be constant.

Large Marker

The large marker group 74G includes a plurality of large markers 74 that are larger in size than the small markers 72 are. The large markers 74 are arranged side by side such that center positions of the large markers 74 are different from the center positions of the small markers 72 and the center positions of the large markers 74 are different from each other. The large markers 74 are arranged such that centers thereof are shifted from the target landing point 2. The large markers 74 are also arranged at positions farther away from the target landing point 2 than the small markers 72 are. In the present embodiment, the large markers 74 are arranged to surround the small marker group 72G with the target landing point 2 centered. In the large marker group 74G, the large markers 74 are then arranged in a matrix form. In FIG. 4, an example of the large markers 74 arranged in two rows and two columns is illustrated, but the number of rows and the number of columns are not particularly limited thereto. The large markers 74 need not be arranged in the matrix form, but may be arranged to be scattered at positions farther away from the target landing point 2 than the small marker group 72G is. In other words, a distance between adjacent large markers 74 need not be constant.

ID Number of Markers

In the present embodiment, each of the markers 7 has information on an ID number as an AR marker. Regarding the ID number, different numbers are assigned to the individual markers 7. In the present embodiment, a lower ID number is assigned to the marker 7 closer to the target landing point 2. An example of the ID numbers is illustrated in FIG. 4. As illustrated in the figure, an ID number of the small marker 72, which is arranged to coincide with the center of the target landing point 2, is assigned as "No. 1", the numbers of "No. 2" to "No. 15" are assigned to the small markers 72 around the target landing point 2, and the numbers of "No. 16" to "No. 19" are assigned to the large markers 74. However, the ID numbers of the small markers 72b that have the same distance from the target landing point 2 as each other, may be swapped with each other. Similarly, the ID numbers of the large markers 74 may be swapped with each other in a case in which the large markers 74 have the same distance from the target landing point 2 as each other. A larger ID number may also be assigned to the marker 7 closer to the target landing point 2.

Marine Vessel

The marine vessel 5 is provided with a navigation system 70, a data transmission device 80, and an operation display unit 90, as illustrated in FIG. 1. The navigation system 70 is, for example, an inertial navigation system (INS), which acquires attitude angles in a pitch direction and a roll direction, a ship heading, velocity, acceleration, position coordinates, and the like of the marine vessel 5. In the present embodiment, the navigation system 70 will be described in application to an inertial navigation system, but is not limited thereto, and any navigation system 70 may be used. Furthermore, in the present embodiment, the navigation system 70 is an inertial navigation system that includes a global positioning system (GPS) serving as a position measurement unit in order to improve the accuracy of position measurement. Although the present embodiment will be described in application to the inertial navigation system including the GPS, the present invention is not particularly limited to the GPS, and it is only required that the position measurement unit is capable of measuring a position with high accuracy. For example, a quasi-zenith satellite system may be used, or the position measurement unit such as the GPS may be omitted provided that a position can be accurately measured by using only the navigation system 70. The navigation system 70 may acquire at least some of various types of data by using a sensor. The data transmission device 80 is included in the automatic landing system 100 described later, and exchanges various signals by wireless communication with a data transmission device 40 mounted in the vertical take-off and landing aircraft 1. The operation display unit 90 is a user interface that enables an operator aboard the marine vessel 5 to identify a control status and to input various types of instructions. Examples of the instructions to be input by the operator by using the operation display unit 90 include a transition instruction in a control mode described later. The details of the transition instruction will be described later. The instruction input via the operation display unit 90 is transmitted from the data transmission device 80 to the data transmission device 40. In addition, the control status of the vertical take-off and landing aircraft 1 is transmitted from the data transmission device 40 to the data transmission device 80. In other words, the data transmission device 40 and the data transmission device 80 are capable of bidirectional communication.

Automatic Landing System

The automatic landing system 100 for the vertical take-off and landing aircraft according to the first embodiment is a system for controlling a position of the vertical take-off and landing aircraft 1 to land the in-flight vertical take-off and landing aircraft 1 on the target landing point 2. The automatic landing system 100 is mounted in the vertical take-off and landing aircraft 1. The automatic landing system 100 includes the camera 10, a navigation system 20, a control unit 30, and the data transmission device 40, as illustrated in FIG. 1.

Imaging Device

The camera 10 is an imaging device mounted on the vertical take-off and landing aircraft 1 by using a gimbal (not illustrated). The camera 10 may be a monocular camera, a compound eye camera, an infrared camera, or other cameras, as long as the camera can image the marker 7. The camera 10 is provided to image the marker 7 provided at the target landing point 2 from the vertical take-off and landing aircraft 1. The camera 10 can adjust an imaging direction with the gimbal (not illustrated). In the present embodiment, the camera 10 is controlled by the control unit 30 such that an imaging range (an angle of view) B (see FIG. 2) of the camera 10 is directed directly downward in a vertical direction, as an example. The camera 10 may be controlled by the control unit 30 such that the imaging range B is directed diagonally forward with respect to the vertical direction. Regarding the camera 10, the gimbal may be omitted, and the camera 10 may be fixed directly under the aircraft body of the vertical take-off and landing aircraft 1 such that the imaging direction is directed downward in the vertical direction, for example. The control unit 30 acquires images captured by the camera 10 with the camera-fixed coordinate system C.

Navigation System

As with the navigation system 70, the navigation system 20 is, for example, an inertial navigation system including the GPS. As with the navigation system 70, the navigation system 20 may be an inertial navigation system including a position measurement unit such as the GPS or may be an inertial navigation system without a position measurement unit such as the GPS, and is not particularly limited thereto. The navigation system 20 including the GPS acquires attitude angles in a pitch direction and a roll direction of the vertical take-off and landing aircraft 1, an aircraft heading, an aircraft velocity, an aircraft acceleration, position coordinates, and the like of the vertical take-off and landing aircraft 1. The navigation system 20 may include an attitude angle sensor that detects attitude angles of the vertical take-off and landing aircraft 1, a velocity detection sensor that detects an aircraft velocity of the vertical take-off and landing aircraft 1, an acceleration detection sensor that detects an aircraft acceleration of the vertical take-off and landing aircraft 1, and a sensor that detects an aircraft heading of the vertical take-off and landing aircraft 1. The navigation system 20 outputs the acquired attitude angles, aircraft velocity, aircraft acceleration, and position coordinates of the vertical take-off and landing aircraft 1 to the control unit 30.

The automatic landing system 100 also includes an altitude sensor 25 that detects an altitude of the vertical take-off and landing aircraft 1 from the ground surface or water surface, as illustrated in FIG. 1. The altitude sensor 25 is, for example, a laser altimeter, and measures a relative altitude $\Delta h$ (see FIG. 2) from the vertical take-off and landing aircraft 1 to the target landing point 2. As the altitude sensor 25, a radio altimeter may be used, a barometric altimeter may be used, or any altimeter may be used. These altimeters may also be applied in combination as appropriate, depending on the usage environment, that is, in order to measure an altitude from the ground surface or an altitude from the sea surface. The altitude sensor 25 outputs the detected relative altitude $\Delta h$ of the vertical take-off and landing aircraft 1 to the control unit 30. The altitude sensor 25 may measure an altitude of the vertical take-off and landing aircraft 1 and outputs the altitude to the control unit 30, and the control unit 30 may cause a guidance calculation unit 34 described later to calculate the relative altitude $\Delta h$ (see FIG. 2) to the target landing point 2 based on the altitude of the vertical take-off and landing aircraft 1. Furthermore, the automatic landing system 100 may cause, not limited to the altitude sensor 25, an image processing unit 32 described later to perform image processing on an image that is captured by the camera 10 and that includes the marker 7 and calculate the relative altitude $\Delta h$ between the vertical take-off and landing aircraft 1 and the marine vessel 5.

Control Unit

The control unit 30 includes the image processing unit 32, the guidance calculation unit 34, and a flight control unit 36. The control unit 30 is provided with an imaging control unit (not illustrated) that controls the imaging direction of the camera 10 by using the gimbal (not illustrated), which is provided on the vertical take-off and landing aircraft 1. In the present embodiment, as described above, the imaging range B of the camera 10 is adjusted to be directed directly downward in the vertical direction.

Image Processing Unit

The image processing unit 32 performs image processing on an image captured by the camera 10 to calculate center positions of the small markers 72 and the large markers 74 (see FIG. 5). First, with reference to FIG. 5, a case in which the small marker 72 (No. 1), whose center position coincides with a center position of the target landing point 2 (Cx, Cy), is recognized in the image will be described. Here, the center position (Cx, Cy) is a coordinate point in the camera-fixed coordinate system C with the center of the image captured by the camera 10 serving as an origin, and can be calculated based on the number of pixels from the center of the image. Specifically, as illustrated in FIG. 5, the image processing unit 32 identifies two diagonals Ld extending between corners of one small marker 72 by image processing, and determines the intersection point of the two identified diagonals Ld as the center position (Cx, Cy). The target landing point 2 is not limited to the center position of the small marker 72, and may be any of the four corners of the small marker 72, or may be a position offset from the center position of the small marker 72.

The image processing unit 32 may identify only one diagonal Ld, and may determine a center position of the length of the identified diagonal Ld as the center position (Cx, Cy). In addition, the image processing unit 32 may identify two or more diagonals Ld, and may determine an average position of the center positions of the lengths of the identified diagonals Ld as the center position (Cx, Cy). Furthermore, in a case in which the image processing unit 32 performs trapezoidal correction on the small marker 72, which has a square shape, by using a function obtained by projection transformation, the image processing unit 32 may calculate the center position (Cx, Cy) of the square shape based on the function. In this case, the trapezoidal correction may be performed by using the coordinate points of the four corners of the small marker 72 or the coordinate points of each point on boundaries marked by black and white of the small marker 72, and the other coordinate points may be calculated by interpolation.

Figure 6:
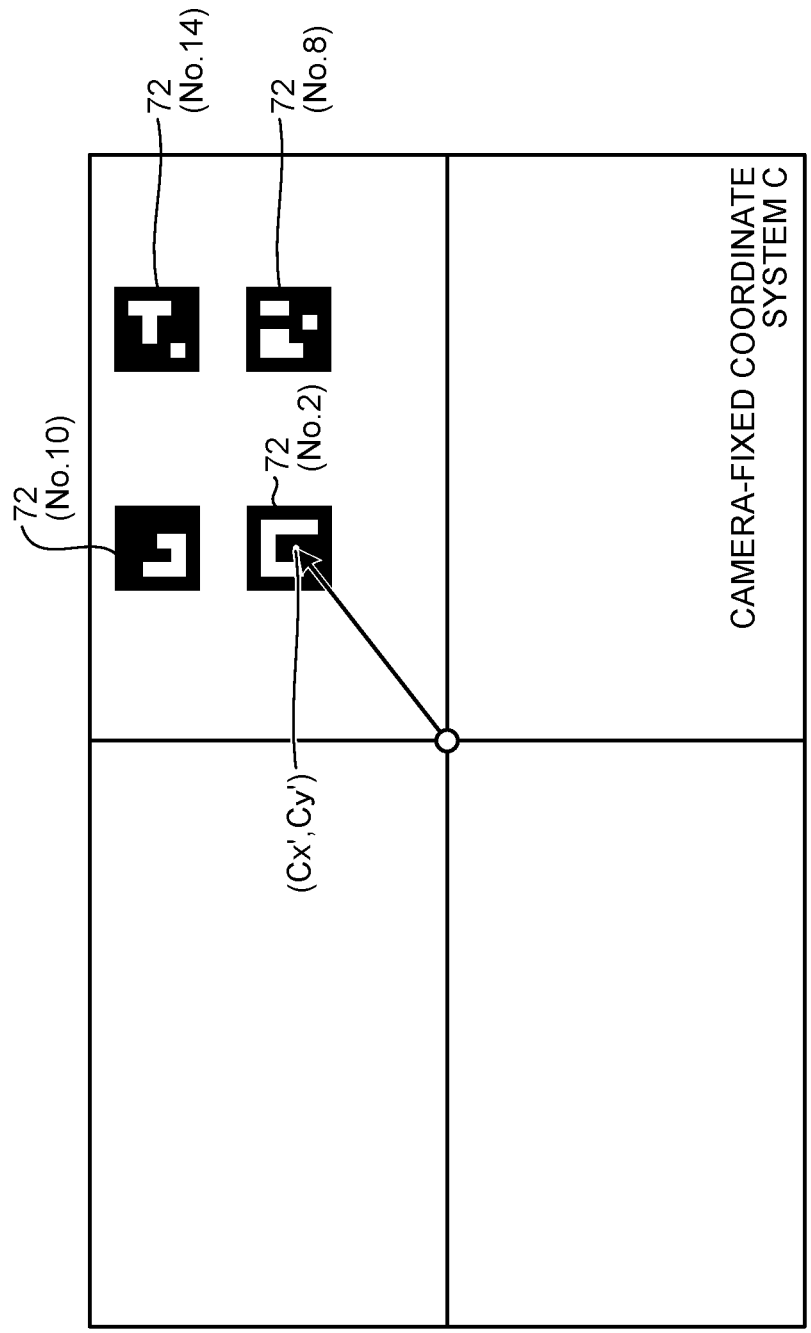
FIG. 6 is an explanatory diagram illustrating an example of a case in which only some markers in the marker group are visible in an image in a camera-fixed coordinate system.
Figure 7:
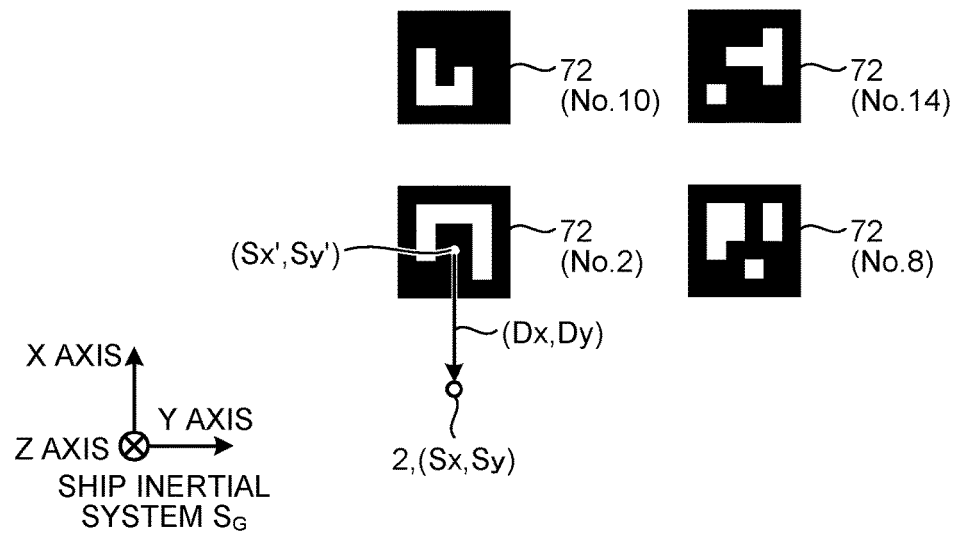
FIG. 7 is an explanatory diagram illustrating an example of a case in which only some markers in the marker group are visible in an image in a ship inertial system.
Figure 8:
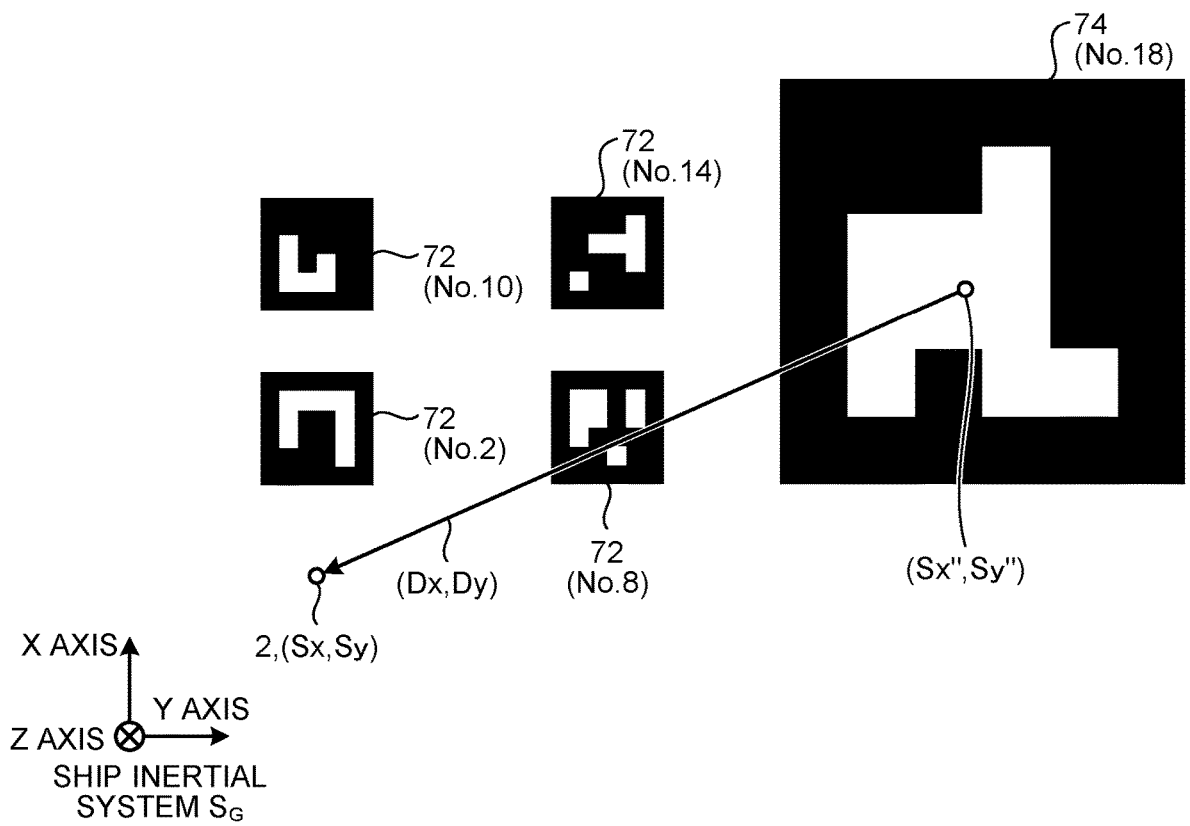
FIG. 8 is an explanatory diagram illustrating an example of a case in which only some markers in the marker group are visible in an image in the ship inertial system.

Next, a case in which any one of the small markers 72 or the large markers 74 arranged around the small marker 72 (No. 1), which is the target landing point 2, is recognized in the image will be described. For example, in a case in which the target landing point 2 is provided on a moving object such as the marine vessel 5, the moving object may rock, or a windblast (gust) may occur around the vertical take-off and landing aircraft 1. Such disturbance may cause some markers in the marker group 7G to deviate from the imaging range B of the camera 10 mounted on the vertical take-off and landing aircraft 1. FIG. 6 to FIG. 8 are explanatory diagrams each of which illustrates an example of a case in which only some markers in the marker group are visible in the image.

As illustrated in FIG. 6, in the camera-fixed coordinate system C, for example, it is assumed that small markers 72 with ID numbers of "No. 2", "No. 8", "No. 10", and "No. 14" are recognized in the image. In this case, the image processing unit 32 calculates a center position (Cx', Cy') of the small marker 72 by using the marker 7 with the smallest ID number among the recognized markers 7. In the example illustrated in FIG. 6, by using the small marker 72 with the smallest ID number "No. 2", the center position (Cx', Cy') of the small marker 72 is calculated. The method for calculating the center position (Cx', Cy') of the small marker 72 is the same as the above-described method for calculating the center of the small marker 72.

Next, as illustrated in FIG. 7, in the ship inertial system $S_G$, the center position of the small marker 72 has coordinates (Sx', Sy') and the target landing point 2 has coordinates (Sx, Sy). A relative positional relation between the target landing point 2 and the center position (Sx', Sy') of the small marker 72, that is, a distance is denoted by (Dx, Dy).

Next, an example illustrated in FIG. 8 will be described. The example illustrated in FIG. 8 is a case in which the altitude of the vertical take-off and landing aircraft 1 is higher than the example illustrated in FIG. 5, and the small markers 72 with the ID numbers of "No. 2", "No. 8", "No. 10", and "No. 14", and a large marker 74 with the ID number "No. 18" appears in the image. In this case, it is assumed that each of the small markers 72 in the image is so small that the image processing unit 32 fails to recognize each of the small markers 72, but successes to recognize only the large marker 74. In that case, in the ship inertial system $S_G$, the center position of the large marker 74 has coordinates (Sx", Sy") and the target landing point 2 has coordinates (Sx, Sy). A relative positional relation between the target landing point 2 and the center position (Sx", Sy") of the large marker 74, that is, a distance (hereinafter, referred to as an offset amount) is denoted by (Dx, Dy). The method for calculating the center position of the large marker 74 in the camera-fixed coordinate system C is the same as the above-described method for calculating the center of the small marker 72.

In addition, the image processing unit 32 may perform, as described above, image processing on the image including the marker 7 captured by the camera 10 to calculate the relative altitude Δh between the vertical take-off and landing aircraft 1 and the marine vessel 5. Furthermore, the image processing unit 32 may perform image processing on the image including the marker 7 captured by the camera 10 to identify an orientation of the marker 7, and associate the identified orientation with the aircraft heading of the vertical take-off and landing aircraft 1 acquired by the navigation system 20 to calculate the ship heading of the marine vessel 5. A marker for calculating the ship heading may be provided on the marine vessel 5 separately.

Guidance Calculation Unit

The guidance calculation unit 34 calculates controlled variables of the vertical take-off and landing aircraft 1 for guiding the vertical take-off and landing aircraft 1 to the target landing point 2. The controlled variables are controlled variables for adjusting an aircraft velocity, attitude angles, an attitude rate, and the like of the vertical take-off and landing aircraft 1. In order to calculate the controlled variables, the guidance calculation unit 34 calculates a relative position (X, Y) between the vertical take-off and landing aircraft 1 and the target landing point 2 and a relative velocity between the vertical take-off and landing aircraft 1 and the target landing point 2.

The guidance calculation unit 34 calculates the relative position (X, Y) between the vertical take-off and landing aircraft 1 and the target landing point 2 based on the center position (Cx', Cy') of the small marker 72 or the center position (Cx", Cy") of the large marker 74 calculated by the image processing unit 32, an azimuth of the camera 10, that is, an aircraft heading of the vertical take-off and landing aircraft 1, an altitude of the vertical take-off and landing aircraft 1 (the relative altitude Δh with respect to the target landing point 2), and an offset amount (Dx, Dy) of each of the markers 72 and 74 with respect to the target landing point 2. In the present embodiment, the azimuth of the camera 10 and the aircraft heading of the vertical take-off and landing aircraft 1 coincide with each other, but the present invention is not particularly limited thereto, and the azimuth of the camera 10 and the aircraft heading of the vertical take-off and landing aircraft 1 need not coincide with each other. As described above, the image processing unit 32 and the guidance calculation unit 34 function as a relative-position acquisition unit that acquires the relative position between the vertical take-off and landing aircraft 1 and the target landing point 2. The relative position (X, Y) is a distance between the vertical take-off and landing aircraft 1 and the target landing point 2 in a horizontal direction. More specifically, the guidance calculation unit 34 converts the center position (Cx', Cy') of the small marker 72 or the center position (Cx", Cy") of the large marker 74 in the camera-fixed coordinate system C calculated by the image processing unit 32, based on the aircraft heading of the vertical take-off and landing aircraft 1 and the altitude of the vertical take-off and landing aircraft 1 (the relative altitude Δh with respect to the target landing point 2), into the relative position (X', Y') between the vertical take-off and landing aircraft 1 and the center position (Sx', Sy') of the marker 72 or the center position (Sx", Sy") of the marker 74 in the ship inertial system $S_G$, and further converts the converted relative position into the relative position (X, Y) between the vertical take-off and landing aircraft 1 and the target landing point 2 in the ship inertial system $S_G$ by adding the offset amount (Dx, Dy). In this case, the guidance calculation unit 34 may directly convert the center position (Cx', Cy') of the small marker 72 or the center position (Cx", Cy") of the large marker 74 into the relative position (X, Y) between the vertical take-off and landing aircraft 1 and the target landing point 2 in the aircraft inertial system $H_G$ based on the aircraft heading of the vertical take-off and landing aircraft 1 and the altitude of the vertical take-off and landing aircraft 1 (the relative altitude Δh with respect to the target landing point 2). The ship inertial system $S_G$ is a coordinate system that has a direction along the ship heading of the marine vessel 5, a direction orthogonal to the ship heading of the marine vessel 5 in the horizontal direction, and orthogonal axes in the vertical direction, with the target landing point 2 serving as an origin. In addition, as illustrated in FIG. 2 and FIG. 3, the aircraft inertial system $H_G$ is a coordinate system in which a direction along the aircraft heading of the vertical take-off and landing aircraft 1 serves as an X axis, a direction orthogonal to the aircraft heading of the vertical take-off and landing aircraft 1 in the horizontal direction serves as a Y axis, and the vertical direction serves as a Z axis, with the vertical take-off and landing aircraft 1 serving as an origin.

Furthermore, the guidance calculation unit 34 calculates a relative position ($X_{GPS}$, $Y_{GPS}$) between the vertical take-off and landing aircraft 1 and the target landing point 2 based on position coordinates in a geographic coordinate system of the vertical take-off and landing aircraft 1 acquired by the navigation system 20 and position coordinates in a geographic coordinate system of the marine vessel 5, which is acquired by the navigation system 70 of the marine vessel 5 and obtained by communication between the data transmission devices 40 and 80. Therefore, the guidance calculation unit 34 functions as a second relative-position acquisition unit that calculates the relative position ($X_{GPS}$, $Y_{GPS}$) between the vertical take-off and landing aircraft 1 and the target landing point 2 based on position coordinates of the vertical take-off and landing aircraft 1 acquired by the GPS and the position coordinates of the marine vessel 5 provided with the target landing point 2, which are acquired by the data transmission device 40.

Here, in the present embodiment, the control unit 30 stores the distance (Dx, Dy) from the center of each marker 7 to the target landing point 2 in a memory (not illustrated) in advance. In the examples illustrated in FIGS. 3, 6, and 7, the guidance calculation unit 34 calculates the relative position (X', Y') between the vertical take-off and landing aircraft 1 and the center position (Sx', Sy') of the small marker 72 in the ship inertial system $S_G$ based on the center position (Cx', Cy') of the small marker 72 with "No. 2" calculated in the image processing unit 32. The guidance calculation unit 34 then calculates the relative position (X, Y) between the vertical take-off and landing aircraft 1 and the center position (Sx, Sy) of the target landing point 2 in the ship inertial system $S_G$ by adding the previously stored distance (Dx, Dy) as the offset amount to the calculated relative position (X', Y'). Therefore, offsetting to the center position (Sx, Sy) of the target landing point 2 can be achieved, even in a case in which only some of the markers 7 cannot be recognized in the image because of disturbance, for example. In the case of offsetting to the center position (Sx, Sy) of the target landing point 2 by using the small marker 72 (No. 1) as described above, it can be said that the distance (Dx, Dy) has the value 0. In the present embodiment, although the small marker 72 (No. 1) is arranged to coincide with the center position (Sx, Sy) of the target landing point 2, this configuration is not necessary, and all of the markers in the small marker group 72G may be composed of the small markers 72 that are shifted from the center position (Sx, Sy) of the target landing point 2.

Next, the example illustrated in FIG. 8 will be described. The guidance calculation unit 34 calculates the relative position (X, Y) between the vertical take-off and landing aircraft 1 and the center position (Sx, Sy) of the target landing point 2 by using the large marker 74 with the smallest ID number "No. 18" recognized in the image. That is, as described above, the guidance calculation unit 34 calculates the relative position (X', Y') between the vertical take-off and landing aircraft 1 and the center position (Sx", Sy") of the large marker 74 in the ship inertial system $S_G$ based on the center position (Cx", Cy") of the large marker 74 calculated in the image processing unit 32. The guidance calculation unit 34 then calculates the relative position (X, Y) between the vertical take-off and landing aircraft 1 and the center position (Sx, Sy) of the target landing point 2 by adding the previously stored distance (Dx, Dy) as the offset amount to the calculated relative position (X', Y'). Therefore, offsetting to the center position (Sx, Sy) of the target landing point 2 can be achieved, even in a case in which the altitude of the vertical take-off and landing aircraft 1 is relatively high, and only the large marker 74 is recognized in the image. Thus, the guidance calculation unit 34 can calculate the relative position (X, Y) offset at the center position (Sx, Sy) of the target landing point 2 by the calculation method described above, even in a case in which any one of the small marker 72 and the large marker 74 is recognized.

Thus, provided that at least one marker 7 in the marker group 7G can be captured by at least the camera 10, the relative position (X, Y) can be calculated based on the marker 7 captured by the camera 10. In other words, there is no need to perform data communication with the marine vessel 5 when calculating the relative position (X, Y). As a result, in a case of controlling the vertical take-off and landing aircraft 1 based on the relative position (X, Y), the guidance calculation unit 34 is not affected by errors or the like caused by the navigation systems 20 and 70. Therefore, the position accuracy can be improved, and the deterioration of responsiveness of flight control caused by communication can be prevented. Thus, the vertical take-off and landing aircraft 1 can land more accurately at the target landing point 2. Accurately controlling the position of the vertical take-off and landing aircraft 1 with respect to the target landing point 2 enables the vertical take-off and landing aircraft 1 not to interfere with devices and structures in the vicinity of the target landing point 2.

The guidance calculation unit 34 also calculates a relative velocity between the vertical take-off and landing aircraft 1 and the target landing point 2. Therefore, the guidance calculation unit 34 functions as a relative-velocity acquisition unit that acquires the relative velocity between the vertical take-off and landing aircraft 1 and the target landing point 2. More specifically, the guidance calculation unit 34 calculates the relative velocity based on, for example, a difference between an aircraft velocity of the vertical take-off and landing aircraft 1 and a hull velocity of the marine vessel 5, which are acquired by the navigation systems 20 and 70. In addition, the guidance calculation unit 34 may calculate the relative velocity based on a pseudo differential of the relative position (X, Y). Furthermore, the guidance calculation unit 34 calculates a relative heading between the aircraft heading of the vertical take-off and landing aircraft 1 and the ship heading of the marine vessel 5.

The guidance calculation unit 34 also calculates the relative altitude Δh to the target landing point 2 based on the altitude of the vertical take-off and landing aircraft 1 detected by the altitude sensor 25. Therefore, the altitude sensor 25 and the guidance calculation unit 34 function as a relative-altitude acquisition unit that acquires the relative altitude Δh between the vertical take-off and landing aircraft 1 and the target landing point 2. In a case in which the image processing unit 32 performs image processing on an image including the markers 7 captured by the camera 10 to calculate the relative altitude Δh between the vertical take-off and landing aircraft 1 and the marine vessel 5, the image processing unit 32 serves as the relative-altitude acquisition unit.

The guidance calculation unit 34 then calculates the controlled variables by feedback control (for example, PID control) based on the relative position (X, Y), the relative velocity, the relative heading, and the aircraft acceleration. In the first embodiment, the guidance calculation unit 34 calculates the controlled variables of the vertical take-off and landing aircraft 1 by feedback control such that the relative position (X, Y) and the relative heading are zero. The guidance calculation unit 34 may also calculate the controlled variables of the vertical take-off and landing aircraft 1 by feedback control such that the relative velocity is within a predetermined velocity and the aircraft acceleration is within a predetermined acceleration. The range within the predetermined velocity and within the predetermined acceleration is a range that satisfies a condition that the vertical take-off and landing aircraft 1 is considered to be in a state of being stably flying at a predetermined relative altitude Δh. For example, the predetermined velocity is zero, and the predetermined acceleration is zero. The guidance calculation unit 34 outputs the calculated controlled variables to the flight control unit 36. In the calculation of such controlled variables, the guidance calculation unit 34 controls the vertical take-off and landing aircraft 1 in a plurality of control modes to guide and land the vertical take-off and landing aircraft 1 to the target landing point. The control modes include an approach mode, a hovering mode including a high-altitude hovering mode and a low-altitude hovering mode, and a landing mode. The details of each control mode will be described later. The automatic landing system 100 controls the relative position (X, Y) to be zero, but practically, after the vertical take-off and landing aircraft 1 lands on the marine vessel 5, the relative position is not necessary zero with errors included, and the positions of the vertical take-off and landing aircraft 1 and the target landing point 2 do not coincide with each other perfectly.

Flight Control Unit

The flight control unit 36 controls each constituent element of the vertical take-off and landing aircraft 1 and causes the vertical take-off and landing aircraft 1 to fly in accordance with the controlled variables calculated by the guidance calculation unit 34 described later. The flight control unit 36 controls a blade pitch angle, a rotational speed, and the like of each of the rotary blades in accordance with the controlled variables, and adjusts the aircraft velocity, attitude angles, attitude rate, and the like of the vertical take-off and landing aircraft 1. Thus, the vertical take-off and landing aircraft 1 is guided to the target landing point 2. In the present embodiment, the image processing unit 32 and the guidance calculation unit 34 are described as functional units separate from the flight control unit 36, but the flight control unit 36, the image processing unit 32, and the guidance calculation unit 34 may be an integrated functional unit. In other words, the flight control unit 36 may perform the processing of the image processing unit 32 and the guidance calculation unit 34.

Landing Control Method for Vertical Take-off and Landing Aircraft

Figure 9:
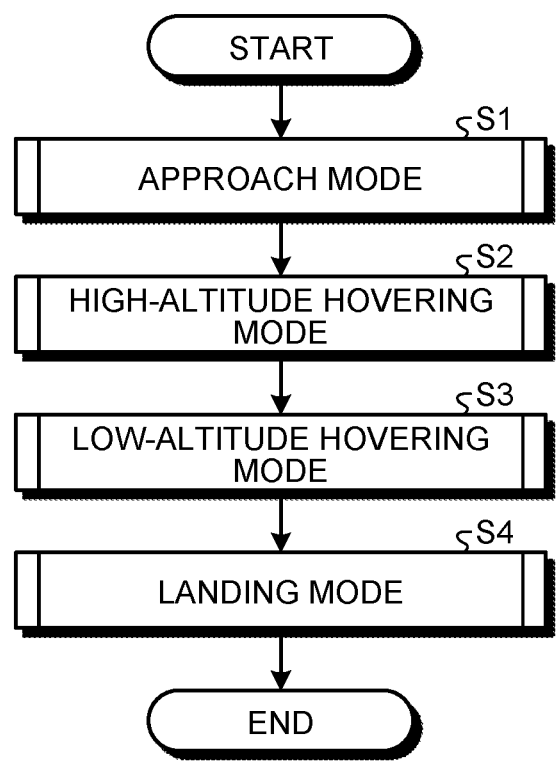
FIG. 9 is a flowchart illustrating an example of a processing procedure of a landing control method of the vertical take-off and landing aircraft of the first embodiment.
Figure 10:
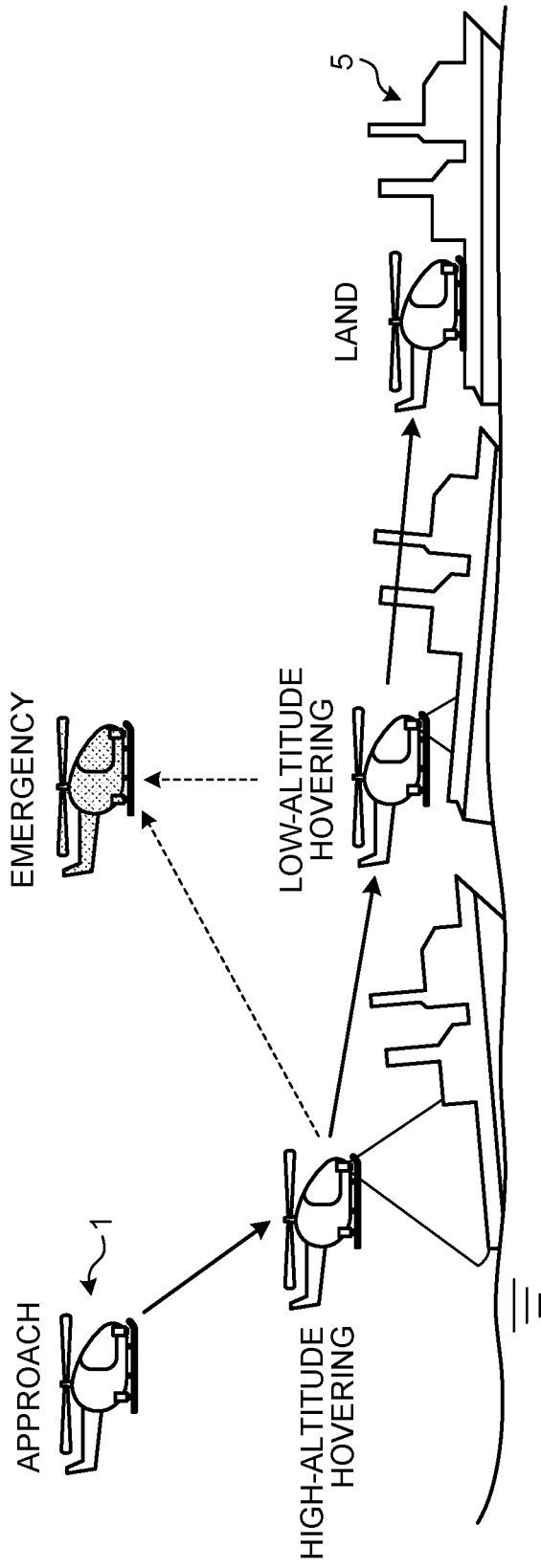
FIG. 10 is an explanatory diagram illustrating a landing operation of the vertical take-off and landing aircraft according to the first embodiment.
Figure 15:
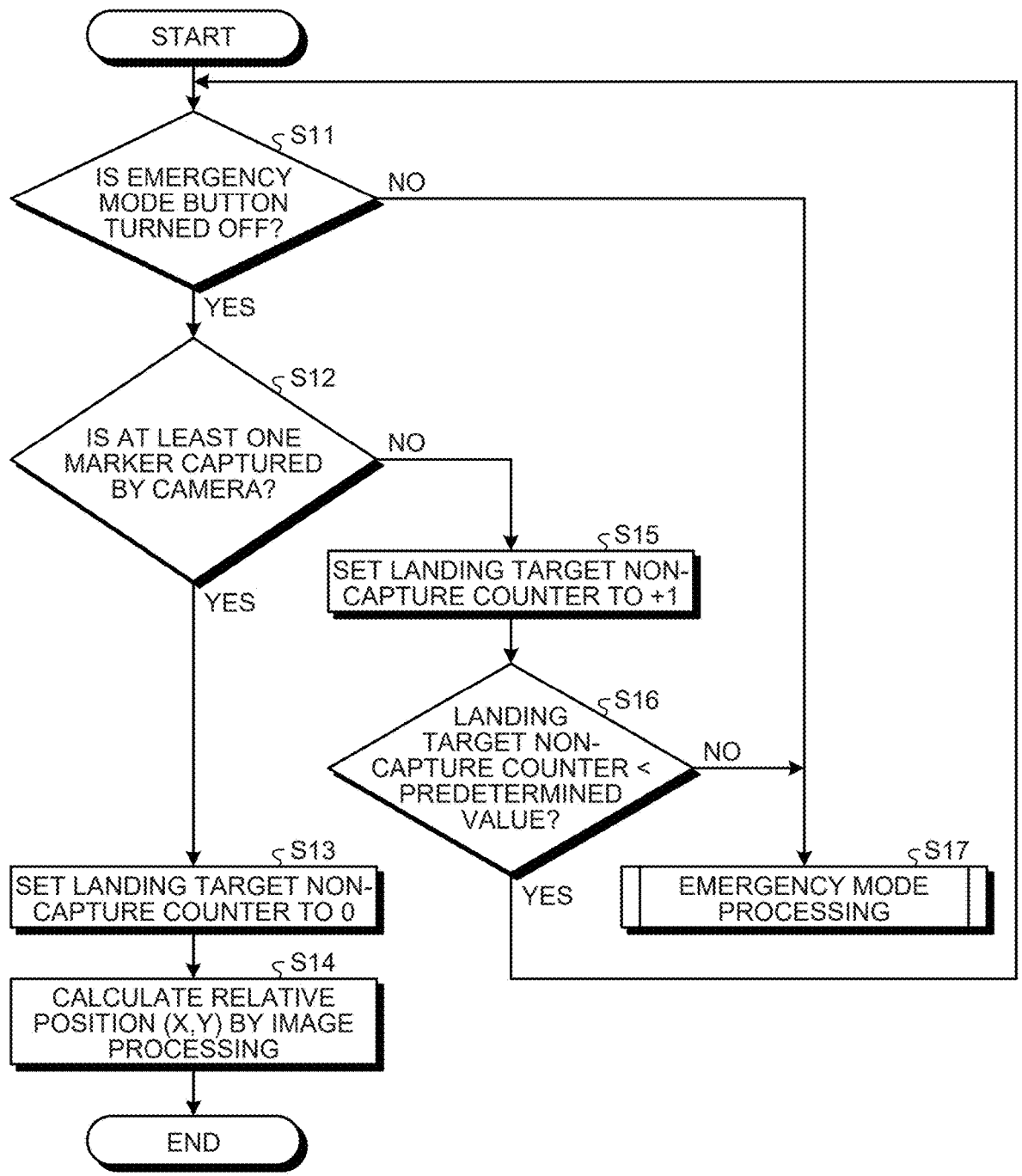
FIG. 15 is a flowchart illustrating an example of relative position calculation processing.

Next, as a landing control method for the vertical take-off and landing aircraft according to the first embodiment, a procedure for guiding the vertical take-off and landing aircraft 1 to the target landing point 2 by the control unit 30 will be described. FIG. 9 is a flowchart illustrating an example of a processing procedure of the landing control method of the vertical take-off and landing aircraft of the first embodiment. FIG. 10 is an explanatory diagram illustrating a landing operation of the vertical take-off and landing aircraft according to the first embodiment. FIG. 11 is a flowchart illustrating an example of a processing procedure in the approach mode. FIG. 12 is a flowchart illustrating an example of a processing procedure in the high-altitude hovering mode. FIG. 13 is a flowchart illustrating an example of a processing procedure in the low-altitude hovering mode. FIG. 14 is a flowchart illustrating an example of a processing procedure in the landing mode. FIG. 15 is a flowchart illustrating an example of relative position calculation processing. The processing illustrated in each of FIG. 9 to FIG. 15 is performed by the guidance calculation unit 34.

First, the landing operation of the vertical take-off and landing aircraft 1 will be described with reference to FIG. 9 and FIG. 10. The vertical take-off and landing aircraft 1 executes the control modes in a series of landing operations to land the vertical take-off and landing aircraft 1 in a flying state on the marine vessel 5. Specifically, the vertical take-off and landing aircraft 1 performs the series of landing operations by performing step S1 of executing the approach mode, step S2 of executing the high-altitude hovering mode, step S3 of executing the low-altitude hovering mode, and step S4 of executing the landing mode, in this order. The vertical take-off and landing aircraft 1 also performs a step (step S17 described later) of executing an emergency mode in which execution of the high-altitude hovering mode and the low-altitude hovering mode is interrupted to interrupt the landing operation.

As illustrated in FIG. 10, the approach mode is a mode in which the vertical take-off and landing aircraft 1 approaches over the deck of the marine vessel 5, and the vertical take-off and landing aircraft 1 hovers over the target landing point 2, based on an instruction from the marine vessel 5. The high-altitude hovering mode is a mode in which the vertical take-off and landing aircraft 1 hovers such that the marker group 7G on the deck is captured by the camera 10, and the target landing point 2 is positioned at the center of the imaging range (angle of view) B of the camera 10. The low-altitude hovering mode is a mode in which the vertical take-off and landing aircraft 1 descends and hovers at a lower altitude than that in the high-altitude hovering mode. The landing mode is a mode in which the vertical take-off and landing aircraft 1 lands on the target landing point 2. The emergency mode is a mode in which the landing operation of the vertical take-off and landing aircraft 1 on the marine vessel 5 is interrupted, and the vertical take-off and landing aircraft 1 ascends.

The vertical take-off and landing aircraft 1 performs the landing operation on the marine vessel 5 by executing these control modes. Next, each of the control modes will be described in detail with reference to FIG. 11 to FIG. 15.

Approach Mode

The guidance calculation unit 34 executes the approach mode as step S1. The approach mode will be described in detail with reference to FIG. 11. As step S31, the guidance calculation unit 34 calculates (generates) the relative position ($X_{GPS}$, $Y_{GPS}$) from position coordinates obtained by the navigation systems 20 and 70, that is, the GPS.

Next, as step S32, the guidance calculation unit 34 determines whether an approach mode button is turned on. The approach mode button is a button provided on the operation display unit 90 of the marine vessel 5 for inputting a transition instruction of the control mode, and is turned on and off by an operator aboard the marine vessel 5. The operator turns on the approach mode button once the vertical take-off and landing aircraft 1 is ready for landing on the marine vessel 5. In a case in which the control unit 30 determines that the approach mode button is not turned on (No at step S32), the control unit 30 continues the processing at step S1. On the other hand, in a case in which the control unit 30 determines that the approach mode button is turned on (Yes at step S32), the control unit 30 proceeds to the processing at step S33.

As step S33, the guidance calculation unit 34 executes feedback control such that the relative position ($X_{GPS}$, $Y_{GPS}$) generated at step S31 is zero. In this way, the guidance calculation unit 34 causes the vertical take-off and landing aircraft 1 to fly toward the target landing point 2 in the horizontal direction. In addition, the guidance calculation unit 34 executes the feedback control such that the calculated relative heading between the aircraft heading of the vertical take-off and landing aircraft 1 and the ship heading of the marine vessel 5 is, as an example, zero. As a result, the guidance calculation unit 34 causes the vertical take-off and landing aircraft 1 to fly such that the aircraft heading of the vertical take-off and landing aircraft 1 coincides with the ship heading of the marine vessel 5 in the horizontal direction. As an example, the guidance calculation unit 34 performs the feedback control such that the relative heading is zero, but the present invention is not particularly limited thereto, and the relative heading may not be zero. Furthermore, the guidance calculation unit 34 executes the feedback control such that the relative altitude Δh measured by the altitude sensor 25 is a first relative altitude Δh1. As a result, the guidance calculation unit 34 causes the vertical take-off and landing aircraft 1 to maintain the first relative altitude Δh1 while causing the vertical take-off and landing aircraft 1 to descend from an initial altitude to the first relative altitude Δh1 (see FIG. 2) in the vertical direction. The first relative altitude Δh1 is, for example, 20 m. Thus, in the approach mode, the guidance calculation unit 34 controls the relative position ($X_{GPS}$, $Y_{GPS}$) to be zero, thereby controlling the flight of the vertical take-off and landing aircraft 1 such that the vertical take-off and landing aircraft 1 is within a predetermined range of the target landing point 2.

The guidance calculation unit 34 executes, as step S34, relative position calculation processing with an image, and calculates the relative position (X, Y) as a distance between the vertical take-off and landing aircraft 1 and the target landing point 2 in the horizontal direction. The details of the relative position calculation processing with an image will be described later.

The guidance calculation unit 34 determines, as step S35, whether the relative position (X, Y) as the distance between the vertical take-off and landing aircraft 1 and the target landing point 2 in the horizontal direction, which has been calculated at step S34, is within a first threshold value. The first threshold value is set as a value of a distance that enables the camera 10 to continue to capture the target landing point 2. In a case in which the guidance calculation unit 34 determines that the relative position (X, Y) is not within the first threshold value (No at step S35), the guidance calculation unit 34 executes the processing at step S33 and subsequent steps again. That is, as a result of determination that the camera 10 cannot capture the target landing point 2, in other words, the vertical take-off and landing aircraft 1 is not sufficiently close to the target landing point 2, the vertical take-off and landing aircraft 1 performs the processing of step S33 and subsequent steps again. The guidance calculation unit 34 then iterates the processing of step S33 and subsequent steps until the vertical take-off and landing aircraft 1 is within a distance sufficient to allow the camera 10 to continue to capture the target landing point 2. In a case in which the guidance calculation unit 34 determines that the relative position (X, Y) is within the first threshold value (Yes at step S35), the guidance calculation unit 34 ends the approach mode and shifts to the next control mode, based on the determination that the vertical take-off and landing aircraft 1 is within a distance sufficient to allow the camera 10 to continue to capture the target landing point 2, that is, the vertical take-off and landing aircraft 1 is sufficiently close to the target landing point 2.

High-Altitude Hovering Mode

The description will be made returning to FIG. 9. In a case in which the approach mode has ended, the guidance calculation unit 34 executes the high-altitude hovering mode, as step S2. The high-altitude hovering mode will be described in detail with reference to FIG. 12. In the high-altitude hovering mode, the guidance calculation unit 34 executes the feedback control such that the relative position (X, Y) calculated in the relative position calculation processing with an image is zero, as illustrated in step S41 in FIG. 12. In addition, the guidance calculation unit 34 executes the feedback control such that the calculated relative heading between the aircraft heading of the vertical take-off and landing aircraft 1 and the ship heading of the marine vessel 5 is, as an example, zero. Furthermore, the guidance calculation unit 34 executes the feedback control such that the relative altitude Δh measured by the altitude sensor 25 is a first relative altitude Δh1. In this way, the guidance calculation unit 34 causes the vertical take-off and landing aircraft 1 to maintain the first relative altitude Δh1 while causing the vertical take-off and landing aircraft 1 to hover directly above the target landing point 2 in the vertical direction. Then, the guidance calculation unit 34 executes the relative position calculation processing with an image again as step S42.

As step S43, the guidance calculation unit 34 determines whether the relative position (X, Y) calculated at step S42 is within a second threshold value, and whether a low-altitude hovering mode button is turned on. The second threshold value is set as a value that is equal to or less than the first threshold value in the approach mode. In addition, the low-altitude hovering mode button is a button provided on the operation display unit 90 of the marine vessel 5 for inputting a transition instruction of the control mode, and is turned on and off by an operator aboard the marine vessel 5. The operator visually checks whether the vertical take-off and landing aircraft 1 is stably flying at the first relative altitude Δh1, and turns on the low-altitude hovering button in the case in which the vertical take-off and landing aircraft 1 is stably flying. At step S43, whether a first condition for transition from the high-altitude hovering mode to the low-altitude hovering mode is satisfied is determined. That is, in the first embodiment, the first condition includes that the operator has instructed a mode transition to the low-altitude hovering mode, in addition to that the relative position (X, Y) is within the second threshold value.

In a case in which the guidance calculation unit 34 determines that the relative position (X, Y) is not within the second threshold value (No at step S43), the guidance calculation unit 34 executes the processing at step S41 and subsequent steps again. In a case in which the guidance calculation unit 34 determines that the low-altitude hovering mode button is not turned on (No at step S43), the guidance calculation unit 34 executes the processing at step S41 and subsequent steps again. The guidance calculation unit 34 then iterates the processing of step S41 and subsequent steps until the relative position (X, Y) of the vertical take-off and landing aircraft 1 with respect to the target landing point 2 is within the second threshold value. In the case in which the guidance calculation unit 34 determines that the relative position (X, Y) is within the second threshold value and that the low-altitude hovering mode button is turned on (Yes at step S43), the guidance calculation unit 34 ends the high-altitude hovering mode and shifts to the next control mode.

Low-Altitude Hovering Mode

The description will be made returning to FIG. 9. In a case in which the high-altitude hovering mode has ended, the guidance calculation unit 34 executes the low-altitude hovering mode, as step S3. The low-altitude hovering mode will be described in detail with reference to FIG. 13. In the low-altitude hovering mode, the guidance calculation unit 34 executes the feedback control such that the relative position (X, Y) calculated in the relative position calculation processing with an image is zero, as illustrated in step S51 in FIG. 13. In addition, the guidance calculation unit 34 executes the feedback control such that the calculated relative heading between the aircraft heading of the vertical take-off and landing aircraft 1 and the ship heading of the marine vessel 5 is, as an example, zero. Furthermore, the guidance calculation unit 34 performs the feedback control such that the relative altitude Δh measured by the altitude sensor 25 is a second relative altitude Δh2 lower than the first relative altitude Δh1. As a result, the guidance calculation unit 34 causes the vertical take-off and landing aircraft 1 to descend its altitude to the second relative altitude Δh2 (see FIG. 2) while causing the vertical take-off and landing aircraft 1 to hover directly above the target landing point 2. The second relative altitude Δh2 is, for example, 3 m. At this time, the guidance calculation unit 34 causes a descent rate of the vertical take-off and landing aircraft 1 to be a first descent rate. The first descent rate is, for example, 0.6 m/s. Then, the guidance calculation unit 34 executes the relative position calculation processing with an image again as step S52.

As step S53, the guidance calculation unit 34 determines whether the relative position (X, Y) calculated at step S52 is within a third threshold value (predetermined value), and whether a landing mode button is turned on. The third threshold value is set as a value that is equal to or less than the second threshold value in the high-altitude hovering. In addition, the landing mode button is a button provided on the operation display unit 90 of the marine vessel 5 for inputting a transition instruction of the control mode, and is turned on and off by an operator aboard the marine vessel 5. The operator visually checks whether the vertical take-off and landing aircraft 1 is stably flying at the second relative altitude Δh2, and turns on the landing mode button in the case in which the vertical take-off and landing aircraft 1 is stably flying. At step S53, whether a second condition (predetermined condition) for transition from the low-altitude hovering mode to the landing mode is satisfied is determined. That is, in the first embodiment, the second condition includes that the operator has instructed a mode transition to the landing mode, in addition to that the relative position (X, Y) is within the third threshold value. The operator may turn on the landing mode button even though the vertical take-off and landing aircraft 1 is not stable.

In a case in which the guidance calculation unit 34 determines that the relative position (X, Y) is not within the third threshold value (No at step S53), the guidance calculation unit 34 executes the processing at step S51 and subsequent steps again. In a case in which the guidance calculation unit 34 determines that the landing mode button is not turned on (No at step S53), the guidance calculation unit 34 executes the processing at step S51 and subsequent steps again. The guidance calculation unit 34 then iterates the processing of step S51 and subsequent steps such that the vertical take-off and landing aircraft 1 is positioned at a position where the relative position (X, Y) with respect to the target landing point 2 is within the third threshold value and descends to the second relative altitude Δh2. In the case in which the guidance calculation unit 34 determines that the relative position (X, Y) is within the third threshold value and that the landing mode button is turned on (Yes at step S53), the guidance calculation unit 34 ends the low-altitude hovering mode and shifts to the next control mode.

Landing Mode

The description will be made returning to FIG. 9. In a case in which the low-altitude hovering mode has ended, the guidance calculation unit 34 executes the landing mode, as step S4. The landing mode will be described in detail with reference to FIG. 14. In the landing mode, the guidance calculation unit 34 executes the feedback control such that the relative position (X, Y) calculated in the relative position calculation processing with an image is zero, as illustrated in step S61 in FIG. 14. In addition, the guidance calculation unit 34 executes the feedback control such that the calculated relative heading between the aircraft heading of the vertical take-off and landing aircraft 1 and the ship heading of the marine vessel 5 is, as an example, zero. Furthermore, the guidance calculation unit 34 performs vertical velocity control for making a descent rate constant until the relative altitude Δh measured by the altitude sensor 25 reaches a third relative altitude Δh3. The descent rate is the degree of altitude descending per unit time. In the vertical velocity control, the guidance calculation unit 34 causes a descent rate of the vertical take-off and landing aircraft 1 to be a second descent rate. As a result, the guidance calculation unit 34 lowers the relative altitude Δh of the vertical take-off and landing aircraft 1 to the third relative altitude Δh3 (see FIG. 2). The third relative altitude Δh3 is, for example, 10 cm. In addition, the second descent rate is, for example, 1.0 m/s. In the present embodiment, although the second descent rate is set to be larger than the first descent rate in order to quickly land the vertical take-off and landing aircraft 1 on the target landing point 2 in the landing mode, any one of the first descent rate and the second descent rate may be set to be larger, or both the first descent rate and the second descent rate may have the same value. Furthermore, in a case in which the altitude of the vertical take-off and landing aircraft 1 reaches the third relative altitude Δh3, the guidance calculation unit 34 causes the vertical take-off and landing aircraft 1 to further descend while maintaining the controlled variable related to the attitude angles of the vertical take-off and landing aircraft 1 when the altitude of the vertical take-off and landing aircraft 1 reaches the third relative altitude Δh3. The guidance calculation unit 34 may cause the vertical take-off and landing aircraft 1 to land on the target landing point 2 while all, none, or some of the controlled variables related to the relative position (X, Y), relative heading, and relative velocity are maintained, as well as the attitude angles.

The guidance calculation unit 34 determines, as step S62, whether at least one marker 7 is captured by the camera 10, that is, whether the target landing point 2 is captured. Whether the at least one marker 7 is captured by the camera 10 can be calculated by the same processing as step S12 in the relative position calculation processing with an image described later. In a case in which the guidance calculation unit 34 determines that the at least one marker 7 is captured by the camera 10 (Yes at step S62), the guidance calculation unit 34 calculates the relative position (X, Y) by the image processing as step S63. The relative position (X, Y) can be calculated by the same processing as step S14 in the relative position calculation processing with an image described later. By contrast, in a case in which the guidance calculation unit 34 determines that not even one marker 7 has been captured by the camera 10 (No at step S62), the guidance calculation unit 34 omits the processing at step S63 and proceeds to step S64. In the present embodiment, the landing mode is continuously performed because, in the landing mode, the vertical take-off and landing aircraft 1 is in a state of being sufficiently close to the target landing point 2, and the vertical take-off and landing aircraft 1 can land near the target landing point 2 even in a case in which the marker 7 temporarily cannot be captured by the camera 10. In a case in which the vertical take-off and landing aircraft 1 is a manned aircraft, the execution of the landing mode may be interrupted based on the determination of a pilot during the execution of the landing mode.

As step S64, the flight control unit 36 determines whether the vertical take-off and landing aircraft 1 has landed on the target landing point 2. Whether the vertical take-off and landing aircraft 1 has landed on the target landing point 2 can be determined based on, for example, the provision of a contact-type sensor on the landing gear (not illustrated) of the vertical take-off and landing aircraft 1 or other conditions. In a case in which the flight control unit 36 determines that the vertical take-off and landing aircraft 1 has not landed on the target landing point 2 (No at step S64), the flight control unit 36 executes the processing at step S61 and subsequent steps again. In this way, the vertical take-off and landing aircraft 1 is controlled to descend in accordance with the procedure of step S61 until the vertical take-off and landing aircraft 1 lands on the target landing point 2. In a case in which the flight control unit 36 determines that the vertical take-off and landing aircraft 1 has landed on the target landing point 2 (Yes at step S64), the guidance calculation unit 34 ends the landing mode. In this way, the processing routine illustrated in FIG. 9 also ends.

Relative Position Calculation Processing with Image

Next, the relative position calculation processing with an image will be described with reference to FIG. 15. In the relative position calculation processing with an image, the guidance calculation unit 34 determines whether an emergency mode button is turned off, as step S11. The emergency mode button is provided on the operation display unit 90 of the marine vessel 5, and is turned on and off by an operator aboard the marine vessel 5. The operator turns on the emergency mode button in a case in which the operator determines that landing of the vertical take-off and landing aircraft 1 on the marine vessel 5 has to be interrupted. Specifically, the operator turns on the emergency mode button in a case of visually checking the fact that the flying state of the vertical take-off and landing aircraft 1 is unstable because of, for example, the influence of wind, occurrence of some kind of failure, or other factors.

In a case in which the guidance calculation unit 34 determines that the emergency mode button has been turned on at step S11 (No at step S11), the guidance calculation unit 34 shifts to the execution of the emergency mode as step S17. In the emergency mode, the guidance calculation unit 34 first causes the vertical take-off and landing aircraft 1 to ascend to a predetermined altitude (for example, 20 m) that is sufficiently away from the marine vessel 5, and maintains the current relative position (X, Y). The guidance calculation unit 34 can perform the emergency mode during the execution of step S2 at which the high-altitude hovering mode illustrated in FIG. 9 is performed and step S3 at which the low-altitude hovering mode is executed. Once the guidance calculation unit 34 causes the vertical take-off and landing aircraft 1 to ascend to the altitude that is sufficiently away from the marine vessel 5 by performing the emergency mode, the guidance calculation unit 34 restarts the processing illustrated in FIG. 9 again from step S1.

By contrast, in a case in which the guidance calculation unit 34 determines that the emergency mode button has been turned off (Yes at step S11), the guidance calculation unit 34 determines whether at least one marker 7 is captured by the camera 10, as step S12. Whether at least one marker 7 is captured by the camera 10 can be determined by whether information that can be used to calculate the center position (Cx', Cy') of the small marker 72 or the center position (Cx", Cy") of the large marker 74 has been obtained in an image captured by the camera 10. In other words, the guidance calculation unit 34 can perform the determination based on whether at least one of the markers 7 in the marker group 7G can be recognized by image processing within the range of the image captured by the camera 10.

In a case in which the guidance calculation unit 34 determines that at least one marker 7 is captured by the camera 10 (Yes at step S12), the guidance calculation unit 34 sets a target non-capture counter to a value of 0, as step S13. The guidance calculation unit 34 then calculates, as step S14, the relative position (X, Y) between the vertical take-off and landing aircraft 1 and the target landing point 2 based on the center position (Cx', Cy') of the small marker 72 or the center position (Cx", Cy") of the large marker 74, the azimuth of the camera 10 (that is, an aircraft heading of the vertical take-off and landing aircraft 1), the altitude of the vertical take-off and landing aircraft 1 (the relative altitude Δh with respect to the target landing point 2), and the offset amount (Dx, Dy) of each of the markers 72 and 74 with respect to the target landing point 2. As described above, the center position (Cx', Cy') of the small marker 72 or the center position (Cx", Cy") of the large marker 74 in the camera-fixed coordinate system C calculated by the image processing unit 32 is converted into the relative position (X', Y') between the vertical take-off and landing aircraft 1 and the center position (Sx', Sy') of the marker 72 or the center position (Sx", Sy") of the marker 74 in the ship inertial system $S_G$, and then the offset amount (Dx, Dy) is further added to the converted relative position, so that the converted relative position is converted into the relative position (X, Y) between the vertical take-off and landing aircraft 1 and the target landing point 2 in the ship inertial system $S_G$. Thus, the relative position (X, Y) is calculated.

On the other hand, at step S12, in a case in which the guidance calculation unit 34 determines that not even one marker 7 has been captured by the camera 10 (No at step S12), the guidance calculation unit 34 adds a value of 1 to the target non-capture counter as step S15, and determines whether the target non-capture counter is within a predetermined value as step S16. In a case in which the guidance calculation unit 34 determines that the target non-capture counter is within a predetermined value (Yes at step S16), the guidance calculation unit 34 executes the processing of step the S11 and subsequent steps again (the processing in FIG. 15 is executed again). In a case in which the guidance calculation unit 34 determines that the target non-capture counter is not within the predetermined value (No at step S16), the guidance calculation unit 34 proceeds to step S17 and shifts to the execution of the emergency mode. That is, in a case in which the target non-capture counter exceeds the predetermined value, the guidance calculation unit 34 determines that a time period for which not even one marker 7 has been captured by the camera 10 continues equal to or longer than a predetermined time period, and executes the emergency mode.

As described above, the automatic landing system 100 for the vertical take-off and landing aircraft according to the first embodiment includes: the camera 10 (imaging device) mounted on the vertical take-off and landing aircraft 1; the image processing unit 32 and the guidance calculation unit 34 (relative-position acquisition unit), which perform image processing on an image captured by the camera 10, the image including the marker group 7G provided at the target landing point 2, to acquire the relative position (X, Y) between the vertical take-off and landing aircraft 1 and the target landing point 2; and the control unit 30 that controls the vertical take-off and landing aircraft 1 such that the relative position (X, Y) becomes zero, in which the marker group 7G includes the markers 7 that are arranged side by side and that have different center positions from each other, the markers 7 are larger as arranged farther away from the target landing point 2, and the image processing unit 32 and the guidance calculation unit 34 acquire the relative position (X, Y) based on the distance (Dx, Dy) between the marker 7 recognized in the image and the target landing point 2.

According to this configuration, it is easier to capture any of the markers 7 included in the marker group 7G in the image, even though a disturbance occurs, for example, a moving object may rock, or a windblast (gust) may occur around the vertical take-off and landing aircraft 1 in a case in which the target landing point 2 is provided on the moving object such as the marine vessel 5. In addition, even though the altitude of the vertical take-off and landing aircraft 1, that is, the distance to the marker group 7G is comparatively large, it is easier to recognize the markers 7 with the larger size in the image because the markers 7 arranged at the positions away from the target landing point 2 are larger. Thus, the target landing point 2 can be captured more stably from the vertical take-off and landing aircraft 1. Therefore, by the vertical take-off and landing aircraft 1, the automatic landing system 100 for the vertical take-off and landing aircraft 1, and the automatic landing method for the vertical take-off and landing aircraft 1 according to the present embodiment, the vertical take-off and landing aircraft 1 can be more stably guided to the target landing point 2.

In addition, the marker group 7G includes the small markers 72 and the large markers 74 that are arranged at positions farther away from the target landing point 2 than the small markers 72 are. According to this configuration, it is easier to recognize the large markers 74 even though the altitude of the vertical take-off and landing aircraft 1 is relatively high, and the small markers 72 cannot be recognized in the image. Therefore, the target landing point 2 can be more stably captured. In a case in which the altitude of the vertical take-off and landing aircraft 1 is relatively low, the small markers 72, which are smaller than the large markers and located closer to the target landing point 2, enable the target landing point 2 to be more stably captured.

Herein, although the markers 7 with two sizes, the small markers 72 and the large markers 74, were used, the marker group 7G may include markers 7 with three or more sizes. In such a case, the larger marker 7 is preferably arranged at a position farther away from the target landing point 2. The marker group 7G may consist of the markers 7 with a single size only.

ID numbers different from each other are assigned to the markers 7 one by one, and the image processing unit 32 and the guidance calculation unit 34 acquire the ID numbers from the markers 7 recognized in the image and acquire the relative position (X, Y) based on the distance (Dx, Dy) between each marker 7 and the target landing point 2, which is stored in advance corresponding to each ID number. According to this configuration, it is possible to use a simple one as the marker 7 because the information included in the marker 7 can be limited to the ID number.

As the marker 7 is closer to the target landing point 2, the smaller ID number is assigned, and the image processing unit 32 and the guidance calculation unit 34 acquire the relative position (X, Y) based on the distance (Dx, Dy) between the marker 7 with the smallest ID number recognized in the image and the target landing point 2. According to this configuration, it can be easier to determine which marker 7 is arranged at a position closer to the target landing point 2 by the size of its ID number. Based on the distance (Dx, Dy) between the marker 7 and the target landing point 2, the relative position (X, Y) offset to the center position (Sx, Sy) of the target landing point 2 can be accurately obtained.

The larger ID number may be assigned to the marker 7 closer to the target landing point 2, and the image processing unit 32 and the guidance calculation unit 34 may acquire the relative position (X, Y) based on the distance (Dx, Dy) between the marker 7 with the largest ID number recognized in the image and the target landing point 2.

In a case in which a plurality of the markers 7 with the same ID number have been recognized in an image, any of the markers 7 may be used, but a marker 7 closest to the center of the image is preferably used first. As a result, the relative position (X, Y) offset to the center position (Sx, Sy) of the target landing point 2 can be calculated more accurately, without being affected by distortion in the vicinity of image edges.

The image processing unit 32 and the guidance calculation unit 34 may also calculate the relative position (X, Y) based on the distance (Dx, Dy) between the target landing point 2 and each of all the markers 7 recognized in the image, and acquire the average value of all of the relative positions (X, Y) calculated, as the final relative position (X, Y). More specifically, in the image processing unit 32, the relative position (X, Y) offset to the center position (Sx, Sy) of the target landing point 2 is calculated for all of the markers 7 recognized in the image, one by one, by the method described above. The average value of all of the relative positions (X, Y) calculated is then acquired as the final relative position (X, Y) at that time.

According to this configuration, the relative position (X, Y) can be acquired more accurately based on all of the markers 7 recognized in the image. In addition, it is no longer necessary to set in advance which marker 7 is to be used first, and any ID number can be set to each marker 7 because all of the markers 7 recognized in the image are used.

The markers 7 may include information on the distance (Dx, Dy) to the target landing point 2 instead of information on the ID numbers. In this case, the image processing unit 32 acquires information on a distance (Dx, Dy) from the target landing point 2 with reference to any of the markers 7 recognized in the image by image processing, and calculates the relative position (X, Y) offset to the center position (Sx, Sy) of the target landing point 2 based on the acquired distance (Dx, Dy). In this case, in a case in which a plurality of the markers 7 have been recognized in the image, any of the markers 7 may be used, but a marker 7 closest to the target landing point 2 is preferably used first.

Second Embodiment

Figure 16:
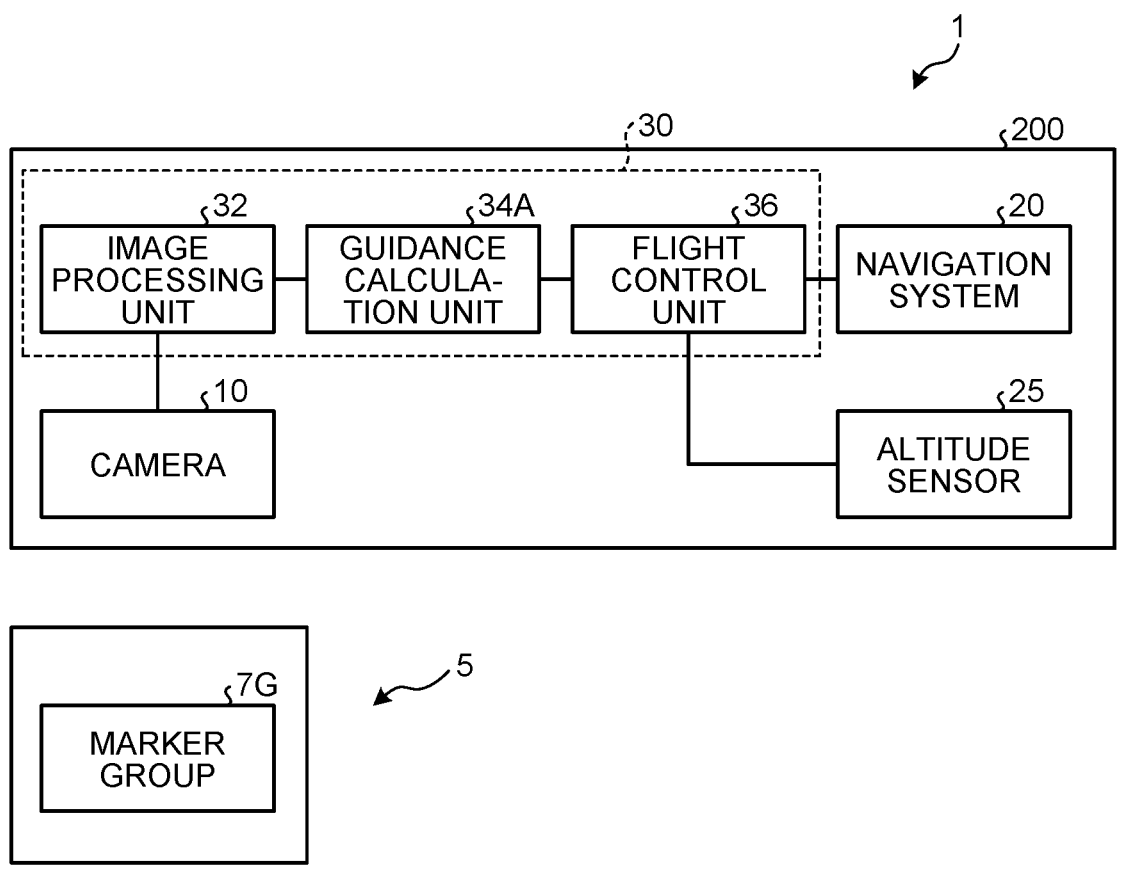
FIG. 16 is a schematic configuration diagram illustrating an example of an automatic landing system for a vertical take-off and landing aircraft according to a second embodiment.

Next, an automatic landing system 200 and a landing control method for a vertical take-off and landing aircraft according to a second embodiment will be described. FIG. 16 is a schematic configuration diagram illustrating an example of an automatic landing system for a vertical take-off and landing aircraft according to the second embodiment. The automatic landing system 200 in the second embodiment has a configuration with the automatic landing system 100 in which the data transmission device 40 is omitted, as illustrated in FIG. 16. The automatic landing system 200 is also provided with a guidance calculation unit 34A instead of the guidance calculation unit 34. Components other than the automatic landing system 200 are similar to those of the automatic landing system 100. Thus, the description will not be repeated, and the same reference numerals are given to the same components. The guidance calculation unit 34A also has the same functions as the guidance calculation unit 34, except for the portions described below. Thus, the description of the similar functions will not be repeated.

In the second embodiment, the marine vessel 5 does not need to be provided with the data transmission device 80 and the operation display unit 90. In FIG. 16, the navigation system 70 is omitted because the exchange of data acquired by the navigation system 70 between the vertical take-off and landing aircraft 1 and the marine vessel 5 is not required.

In the second embodiment, the automatic landing system 200 does not perform data communication with the marine vessel 5. Therefore, the hull velocity from the marine vessel 5 cannot be acquired during the calculation of the relative velocity. Therefore, in the second embodiment, the guidance calculation unit 34 calculates the relative velocity based on the relative position (X, Y) between the vertical take-off and landing aircraft 1 and the target landing point 2. Specifically, the guidance calculation unit 34A calculates the relative velocity by pseudo-differentiating the relative position (X, Y).

Next, the details of the landing control method in the second embodiment will be described. In the second embodiment, the guidance calculation unit 34A does not perform the processing at step S1 in the flowchart illustrated in FIG. 9, but uses other methods to cause the vertical take-off and landing aircraft 1 to be closer to the marine vessel 5, that is, the target landing point 2, to the extent that a marker 7 is captured in the imaging range B of the camera 10. As the other methods, for example, a method for mounting a laser emission device mounted on the vertical take-off and landing aircraft 1, emitting a laser toward the marine vessel 5, receiving a reflected wave on the vertical take-off and landing aircraft 1 side, acquiring a relative position between the vertical take-off and landing aircraft 1 and the marine vessel 5, and guiding the vertical take-off and landing aircraft 1 to the marine vessel 5 (target landing point 2) based on the relative position, or other methods can be mentioned.

Figure 17:
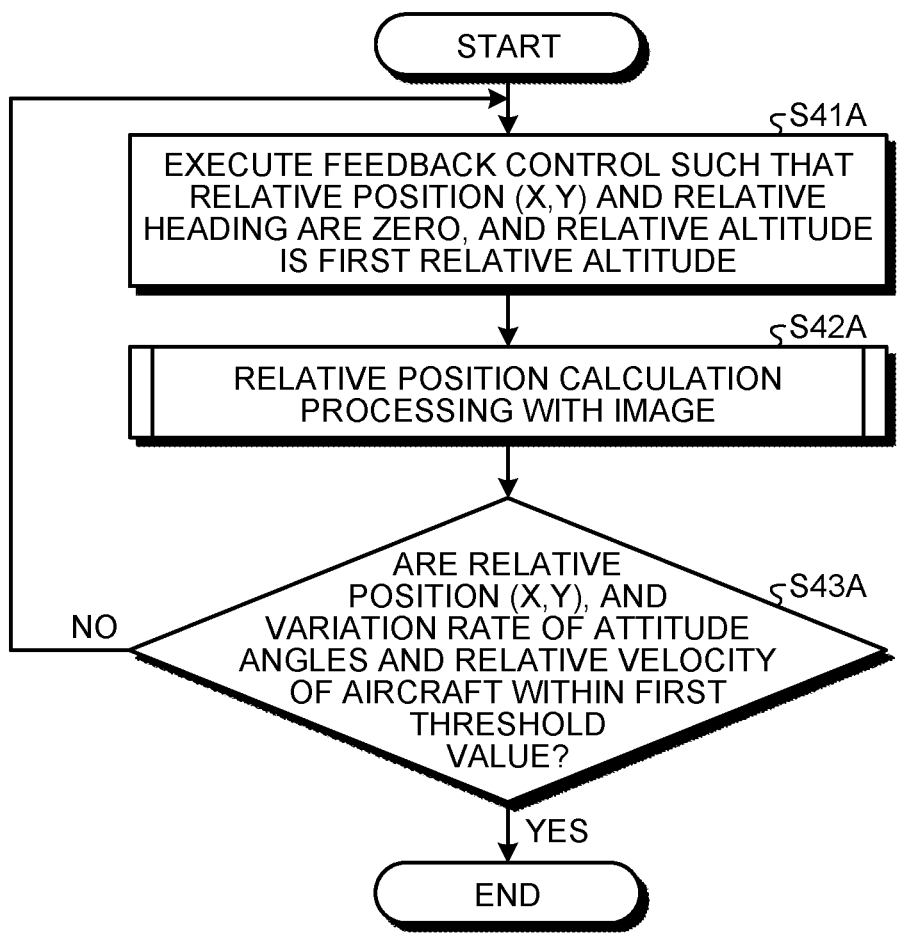
FIG. 17 is a flowchart illustrating an example of a processing procedure of a high-altitude hovering mode in the second embodiment.
Figure 18:
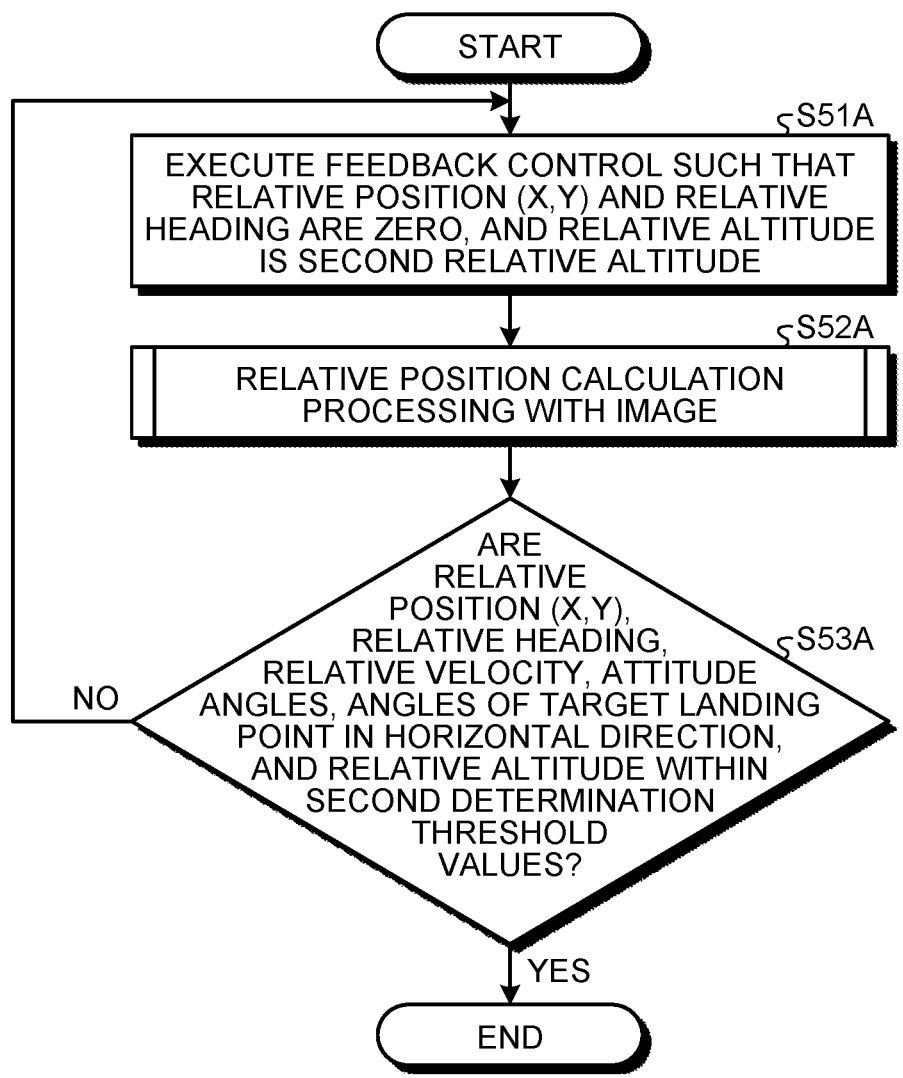
FIG. 18 is a flowchart illustrating an example of a processing procedure of a low-altitude hovering mode in the second embodiment.

In a case in which the vertical take-off and landing aircraft 1 comes sufficiently close to the marine vessel 5, that is, the target landing point 2 to the extent that the marker 7 is captured in the imaging range B of the camera 10, the guidance calculation unit 34A calculates the relative position (X, Y) by the same processing as that at step S14 in the relative position calculation processing with an image illustrated in FIG. 15, and in a case in which the calculated relative position (X, Y) is within the first threshold value, the processing illustrated in FIG. 17 and FIG. 18 is executed instead of the processing at step S2 (FIG. 12) and step S3 (FIG. 13) in FIG. 9. FIG. 17 is a flowchart illustrating an example of a processing procedure of a high-altitude hovering mode in the second embodiment. FIG. 18 is a flowchart illustrating an example of a processing procedure of a low-altitude hovering mode in the second embodiment.

With reference to FIG. 17, the high-altitude hovering mode in the second embodiment is will be described. Step S41A and step S42A in FIG. 17 are the same processing as that at step S41 and step S42 in FIG. 12. Thus, the description will not be repeated. In the second embodiment, the relative position calculation processing with an image is the same processing as illustrated in FIG. 15.

As step S43A, the guidance calculation unit 34A determines whether a relative position (X, Y), an attitude rate (pitch direction and roll direction) of the vertical take-off and landing aircraft 1, and a relative velocity calculated at step S42A are within corresponding first determination threshold values. The first determination threshold value corresponding to the relative position (X, Y) is the second threshold value in the first embodiment. The first determination threshold values corresponding to the attitude rate and the relative velocity are set separately for each parameter. The first determination threshold values corresponding to the attitude rate and the relative velocity are provided instead of turning on the low-altitude hovering mode button by the operator in the first embodiment. Therefore, the first determination threshold values corresponding to the attitude rate and the relative velocity are set to satisfy a state in which the vertical take-off and landing aircraft 1 is stably flying at the first relative altitude Δh1.

In a case in which the guidance calculation unit 34A determines that the relative position (X, Y) is not within the corresponding first determination threshold value, that is, the second threshold value (No at step S43A), the guidance calculation unit 34A executes the processing at step S41A and subsequent steps again. In a case in which the guidance calculation unit 34A determines that the attitude rate and the relative velocity are not within the corresponding first determination threshold values (No at step S43A), the guidance calculation unit 34A executes the processing at step S41A and subsequent steps again.

By contrast, in a case in which the guidance calculation unit 34A determines that the relative position (X, Y) is within the second threshold value and the attitude rate and the relative velocity are within the corresponding first determination threshold values (Yes at step S43A), the guidance calculation unit 34A ends the high-altitude hovering mode and shifts to the low-altitude hovering mode. At step S43A, whether a first condition for transition from the high-altitude hovering mode to the low-altitude hovering mode is satisfied is determined. That is, in the second embodiment, the first condition includes that the attitude rate and the relative velocity are within the corresponding first determination threshold values, as well as the relative position (X, Y) is within the second threshold value.

With reference to FIG. 18, the low-altitude hovering mode in the second embodiment is will be described. Step S51A and step S52A in FIG. 18 are the same processing as that at step S51 and step S52 in FIG. 13 in the first embodiment. Thus, the description will not be repeated.

As step S53A, the guidance calculation unit 34A determines whether the relative position (X, Y), the attitude rate (pitch direction and roll direction) of the vertical take-off and landing aircraft 1, which are calculated at step S52A, a relative heading, a relative velocity, attitude angles (roll direction and pitch direction), angles (roll direction and pitch direction) of the target landing point 2 in the horizontal direction, and a relative altitude ah are within corresponding second determination threshold values. The second determination threshold value corresponding to the relative position (X, Y) is the third threshold value in the first embodiment. The second determination threshold value of the relative altitude Δh is a second relative altitude Δh2. The second determination threshold value of the relative altitude Δh is provided to automatically determine that the vertical take-off and landing aircraft 1 has descended to and stabilized at the second relative altitude Δh2 in the low-altitude hovering mode.

The second determination threshold values to which the attitude rate, relative heading, relative velocity, attitude angles of the vertical take-off and landing aircraft 1, and the angles of the target landing point 2 in the horizontal direction correspond are set separately for each parameter. The angles of the target landing point 2 in the horizontal direction are angles in the horizontal direction at a plane on which the target landing point 2 of the marine vessel 5 is provided, and can be calculated by performing image processing on the image of the marker 7 captured by the camera 10 in the image processing unit 32. The second determination threshold values corresponding to the attitude rate, the relative heading, the relative velocity, the attitude angles, and the angles of the target landing point 2 in the horizontal direction are provided instead of turning on the landing mode button by the operator in the first embodiment. Therefore, the second determination threshold values corresponding to the attitude rate, the relative heading, the relative velocity, the attitude angles, and the angles of the target landing point 2 in the horizontal direction are set to satisfy a state in which the vertical take-off and landing aircraft 1 is stably flying at the second relative altitude Δh2. The second determination threshold values of the attitude rate and the relative velocity may be smaller than or the same as those of the first determination threshold values.

In a case in which the guidance calculation unit 34A determines that the relative position (X, Y) is not within the corresponding second determination threshold value, that is, the third threshold value (No at step S53A), the guidance calculation unit 34A executes the processing at step S51A and subsequent steps again. In addition, in a case in which the guidance calculation unit 34A determines that the relative altitude Δh is not within the corresponding first determination threshold value, that is, the second relative altitude Δh2 (No at step S53A), the guidance calculation unit 34A executes the processing at step S51A and subsequent steps again. Furthermore, in a case in which the guidance calculation unit 34A determines that the attitude rate, the relative heading, the relative velocity, the attitude angles, and the angles of the target landing point 2 in the horizontal direction are not within the corresponding second determination threshold values (No at step S53A), the guidance calculation unit 34A executes the processing at step S51A and subsequent steps again.

By contrast, in a case in which the guidance calculation unit 34A determines that the relative position (X, Y) is within the second determination threshold value, that is, the third threshold value, the relative altitude Δh is within the second relative altitude Δh2, and the attitude rate, the relative heading, the relative velocity, the attitude angles, and the angles of the target landing point 2 in the horizontal direction are within the corresponding second determination threshold values (Yes at step S53A), the guidance calculation unit 34A ends the low-altitude hovering mode and shifts to the landing mode. At step S53A, whether a second condition (predetermined condition) for transition from the low-altitude hovering mode to the landing mode is satisfied is determined. That is, in the second embodiment, the second condition includes that the attitude rate, the relative heading, the relative velocity, the attitude angles, the angles of the target landing point 2 in the horizontal direction, and the relative altitude Δh are within the corresponding second determination threshold values, as well as the relative position (X, Y) is within the third threshold value.

As described above, in the second embodiment, other control examples of the high-altitude hovering mode and the low-altitude hovering mode have been described. In the second embodiment as described above, as in the first embodiment, the acquisition of the relative position (X, Y) by using the marker group 7G, which includes the markers 7, enables the vertical take-off and landing aircraft 1 to be more stably guided to the target landing point 2.

The automatic landing system 200 for the vertical take-off and landing aircraft according to the second embodiment can calculate the relative position (X, Y) based on the marker 7 captured by the camera 10 and the relative velocity based on the relative position (X, Y). Therefore, there is no need to perform data communication with the marine vessel 5 when calculating the relative position (X, Y) and the relative velocity. As a result, the system can be simplified by eliminating the need for data communication during the control of the vertical take-off and landing aircraft 1 based on the relative position (X, Y) and the relative velocity.

In the second embodiment, automatic transition from the high-altitude hovering mode to the low-altitude hovering mode and from the low-altitude hovering mode to the landing mode can be achieved while flying the vertical take-off and landing aircraft 1 stably, without transition instructions from the operator. Therefore, there is no need to exchange data with the marine vessel 5 during the transition from the high-altitude hovering mode to the low-altitude hovering mode or the transition from the low-altitude hovering mode to the landing mode.

Third Embodiment

Next, an automatic landing system 300 and a landing control method for a vertical take-off and landing aircraft 1 according to a third embodiment will be described. FIG. 19 is a schematic configuration diagram illustrating an automatic landing system according to the third embodiment. As illustrated in FIG. 19, the automatic landing system 300 according to the third embodiment includes an image processing unit 32B instead of the image processing unit 32 of the automatic landing system 200, and a guidance calculation unit 34B instead of the guidance calculation unit 34A according to the second embodiment. Components other than the automatic landing system 300 are similar to those of the automatic landing system 200. Thus, the description will not be repeated, and the same reference numerals are given to the same components. The image processing unit 32B and the guidance calculation unit 34B also have the same functions as the image processing unit 32 and the guidance calculation unit 34 do, except for the portions described below. Thus, the description of the similar functions will not be repeated.

In the third embodiment, the marine vessel 5 does not need to be provided with the data transmission device 80 and the operation display unit 90 similar to the second embodiment. In FIG. 19, the navigation system 70 is omitted because the exchange of data acquired by the navigation system 70 between the vertical take-off and landing aircraft 1 and the marine vessel 5 is not required.

In the third embodiment, the marine vessel 5 is also provided with an operation display unit 95 connected to the marker group 7G. In the third embodiment, a plurality of markers 7 included in the marker group 7G are displayed on a display device (not illustrated), such as a liquid crystal display, for example, and a marker shape is variable. Each of the markers 7 includes at least a shape to instruct the transition from the high-altitude hovering mode to the low-altitude hovering mode and a shape to instruct the transition from the low-altitude hovering mode to the landing mode. The markers 7 included in the marker group 7G are changed at once to a shape to instruct the transition from the high-altitude hovering mode to the low-altitude hovering mode and a shape to instruct the transition from the low-altitude hovering mode to the landing mode. In addition, each of the markers 7, in any shape, contains the same information on the ID number or the distance (Dx, Dy) as in the first embodiment. The entire marker group 7G may be displayed on a single display device, or each of the markers 7 may be displayed one by one or in multiple units on individual display devices.

The image processing unit 32B identifies, by image processing, a shape of each of the markers 7 in the image captured by the camera 10, and outputs an instruction based on the identified shape to the guidance calculation unit 34B.

Specifically, in a case in which the image processing unit 32B has identified that a marker 7 is in a shape to instruct the transition from the high-altitude hovering mode to the low-altitude hovering mode, the image processing unit 32B outputs a transition instruction from the high-altitude hovering mode to the low-altitude hovering mode to the guidance calculation unit 34B. Specifically, in a case in which the image processing unit 32B has identified that the marker 7 is in a shape to instruct the transition from the low-altitude hovering mode to the high-altitude hovering mode, the image processing unit 32B outputs a transition instruction from the low-altitude hovering mode to the landing mode to the guidance calculation unit 34B.

The guidance calculation unit 34B calculates a relative velocity by using the same method for the guidance calculation unit 34A in the second embodiment. In this way, as in the second embodiment, the relative velocity can be acquired without acquisition of the hull velocity from the marine vessel 5.

Next, the landing control method in the third embodiment will be described. In the third embodiment, the guidance calculation unit 34B does not perform the processing at step S1 to step S3 in the flowchart illustrated in FIG. 9, similar to the second embodiment, but uses other methods to cause the vertical take-off and landing aircraft 1 to be closer to the marine vessel 5, that is, the target landing point 2, to the extent that a marker 7 is captured in the imaging range B of the camera 10. In a case in which the vertical take-off and landing aircraft 1 comes sufficiently close to the marine vessel 5, that is, the target landing point 2 to the extent that the marker 7 is captured in the imaging range B of the camera 10, the guidance calculation unit 34B then calculates the relative position (X, Y) by the same processing as that at step S14 in the relative position calculation processing with an image illustrated in FIG. 15, and in a case in which the calculated relative position (X, Y) is within the first threshold value, the processing illustrated in FIG. 20 and FIG. 21 is executed instead of the processing at step S2 (FIG. 12) and step S3 (FIG. 13) in FIG. 9. FIG. 20 is a flowchart illustrating an example of a processing procedure of the high-altitude hovering mode in the third embodiment. FIG. 21 is a flowchart illustrating an example of a processing procedure of the low-altitude hovering mode in the third embodiment.

With reference to FIG. 20, the high-altitude hovering mode in the third embodiment is will be described. Step S41B and step S42B in FIG. 20 are the same processing as that at step S41 and step S42 in FIG. 12. Thus, the description will not be repeated. In the third embodiment, the relative position calculation processing with an image is the same processing as illustrated in FIG. 15.

As step S43B, the guidance calculation unit 34B determines whether the relative position (X, Y) calculated at step S42B is within the second threshold value, and whether the marker 7 is in the shape to indicate the transition to the low-altitude hovering mode. The determination of whether the marker 7 is in the shape to indicate the transition to the low-altitude hovering mode is provided instead of turning on the low-altitude hovering mode button by the operator in the first embodiment. The operator visually checks whether the vertical take-off and landing aircraft 1 is stably flying at the first relative altitude Δh1, and changes, by the operation display unit 95, the marker 7 to be in the shape to indicate the transition to the low-altitude hovering mode in the case in which the vertical take-off and landing aircraft 1 is stably flying.

In a case in which the guidance calculation unit 34B determines that the relative position (X, Y) is not within the corresponding second threshold value (No at step S43B), the guidance calculation unit 34B executes the processing at step S41B and subsequent steps again. In a case in which the guidance calculation unit 34B determines that the marker 7 is not in the shape to indicate the transition to the low-altitude hovering mode (No at step S43B), the guidance calculation unit 34B executes the processing at step S41B and subsequent steps again. In this way, as in the first embodiment, the flight of the vertical take-off and landing aircraft 1 is controlled by feedback control such that the relative position (X, Y) to the target landing point 2 is positioned within the second threshold value, and the first relative altitude Δh1 is maintained.

In the case in which the guidance calculation unit 34B determines that the relative position (X, Y) is within the second threshold value and that the marker 7 is in the shape to indicate the transition to the low-altitude hovering mode (Yes at step S43B), the guidance calculation unit 34B ends the high-altitude hovering mode and shifts to the low-altitude hovering mode. In the third embodiment, at step S43B, whether a first condition for transition from the high-altitude hovering mode to the low-altitude hovering mode is satisfied is determined. That is, in the third embodiment, the first condition includes that the marker 7 is in the shape to indicate the transition to the low-altitude hovering mode, in addition to that the relative position (X, Y) is within the second threshold value.

With reference to FIG. 21, the low-altitude hovering mode in the third embodiment is will be described. Step S51B and step S52B in FIG. 21 are the same processing as that at step S51 and step S52 in FIG. 13 in the first embodiment. Thus, the description will not be repeated.

As step S53B, the guidance calculation unit 34B determines whether the relative position (X, Y) calculated at step S52B is within the third threshold value, and whether the marker 7 is in the shape to indicate the transition to the landing mode. The determination of whether the marker 7 is in the shape to indicate the transition to the landing mode is provided instead of turning on the landing mode button by the operator in the first embodiment. The operator visually checks whether the vertical take-off and landing aircraft 1 is stably flying at the second relative altitude Δh2, and changes, by the operation display unit 95, the marker 7 to be in the shape to indicate the transition to the landing mode in the case in which the vertical take-off and landing aircraft 1 is stably flying.

In a case in which the guidance calculation unit 34B determines that the relative position (X, Y) is not within the corresponding second threshold value (No at step S53B), the guidance calculation unit 34B executes the processing at step S51B and subsequent steps again. In a case in which the guidance calculation unit 34B determines that the marker 7 is not in the shape to indicate the transition to the landing mode (No at step S53B), the guidance calculation unit 34B executes the processing at step S51B and subsequent steps again. In this way, as in the first embodiment, the flight of the vertical take-off and landing aircraft 1 is controlled by feedback control such that the relative position (X, Y) to the target landing point 2 is positioned within the third threshold value, and the second relative altitude Δh2 is maintained.

In the case in which the guidance calculation unit 34B determines that the relative position (X, Y) is within the third threshold value and that the marker 7 is in the shape to indicate the transition to the landing mode (Yes at step S53B), the guidance calculation unit 34B ends the low-altitude hovering mode and shifts to the landing mode. In the third embodiment, at step S53B, whether a second condition (predetermined condition) for the transition from the low-altitude hovering mode to the landing mode is satisfied is determined. That is, in the third embodiment, the second condition includes that the marker 7 is in the shape to indicate the transition to the landing mode, in addition to that the relative position (X, Y) is within the third threshold value.

As described above, in the third embodiment, the example in which the marker shape of each marker 7 is variable has been described. In the third embodiment as described above, as in the first embodiment, the acquisition of the relative position (X, Y) by using the marker group 7G, which includes the markers 7, enables the vertical take-off and landing aircraft 1 to be more stably guided to the target landing point 2.

In addition, even in the automatic landing system 300 for the vertical take-off and landing aircraft according to the third embodiment, there is no need to perform data communication with the marine vessel 5 when calculating the relative position (X, Y) and the relative velocity. As a result, the system can be simplified by eliminating the need for data communication during the control of the vertical take-off and landing aircraft 1 based on the relative position (X, Y) and the relative velocity.

In the third embodiment, the transition from the high-altitude hovering mode to the low-altitude hovering mode and the transition from the low-altitude hovering mode to the landing mode can be executed based on changes in the marker shapes without receiving the instruction for mode transition from the operator via data communication. Therefore, there is no need to exchange data with the marine vessel 5 during the transition from the high-altitude hovering mode to the low-altitude hovering mode or from the low-altitude hovering mode to the landing mode, and the instruction for the mode transition can be achieved without communication, and for example, the instruction for the mode transition can be achieved even in a radio blockade environment.

REFERENCE SIGNS LIST

1 Vertical take-off and landing aircraft
2 Target landing point
5 Marine vessel
7 Marker
7G Marker group
72 Small marker
72G Small marker group
74 Large marker
74G Large marker group
10 Camera
20, 70 Navigation system
25 Altitude sensor
30 Control unit
32, 32B Image processing unit
34, 34A, 34B Guidance calculation unit
36 Flight control unit
40, 80 Data transmission device
90, 95 Operation display unit
100, 200, 300 Automatic landing system

The invention claimed is:

1. An automatic landing system for a vertical take-off and landing aircraft, comprising:
   an imaging device that is mounted on the vertical take-off and landing aircraft; and
   a processor, wherein the processor is configured to:
     perform image processing on an image captured by the imaging device, the image including a marker group provided at a target landing point, to acquire a relative position between the vertical take-off and landing aircraft and the target landing point; and
     control the vertical take-off and landing aircraft so that the relative position becomes zero, wherein
   the target landing point is provided on a moving object,
   the marker group includes a plurality of markers that are arranged side by side and that have different center positions from each other,
   the markers are larger as arranged farther away from the target landing point, and
   the processor is further configured to:
     acquire the relative position based on a distance between the marker recognized in the image and the target landing point; and
     control the vertical take-off and landing aircraft based on the relative position, a relative velocity between the vertical take-off and landing aircraft and the target landing point, a relative heading between a heading of the vertical take-off and landing aircraft and a heading of the moving object, and an acceleration of the vertical take-off and landing aircraft.

2. The automatic landing system for a vertical take-off and landing aircraft according to claim 1, wherein the marker group includes a small marker and a large marker, the large marker being positioned farther away from the target landing point than the small marker is.

3. The automatic landing system for a vertical take-off and landing aircraft according to claim 1, wherein
   ID numbers different from each other are assigned to the markers one by one, and
   the processor acquires the ID numbers from the markers recognized in the image and acquires the relative position based on a distance between each of the markers and the target landing point, the distance being stored in advance corresponding to each of the ID numbers.

4. The automatic landing system for a vertical take-off and landing aircraft according to claim 3, wherein
   a smaller number or a larger number of the ID numbers is assigned to a marker, of the plurality of markers, which is closer to the target landing point, and
   the processor acquires the relative position based on a distance between the target landing point and the marker recognized in the image with a smallest ID number or the marker recognized in the image with a largest ID number.

5. The automatic landing system for a vertical take-off and landing aircraft according to claim 1, wherein
   the processor calculates the relative position based on a distance between each of all the markers recognized in the image and the target landing point, and acquires an average value of all of the calculated relative positions as a final relative position.

6. A vertical take-off and landing aircraft comprising the automatic landing system for a vertical take-off and landing aircraft according to claim 1.

7. A landing control method for a vertical take-off and landing aircraft comprising:
   performing image processing on an image captured by an imaging device that is mounted on a vertical take-off and landing aircraft, the image including a marker group provided at a target landing point, to acquire a relative position between the vertical take-off and landing aircraft and the target landing point, the target landing point being provided on a moving object; and controlling the vertical take-off and landing aircraft such that the relative position becomes zero, wherein the marker group includes a plurality of markers that are arranged side by side and that have different center positions from each other, the markers are larger as arranged farther away from the target landing point, the acquiring of the relative position includes acquiring the relative position based on a distance between the marker recognized in the image and the target landing point, and wherein the controlling of the vertical take-off and landing aircraft includes controlling the vertical take-off and landing aircraft based on the relative position, a relative velocity between the vertical take-off and landing aircraft and the target landing point, a relative heading between a heading of the vertical take-off and landing aircraft and a heading of the moving object, and an acceleration of the vertical take-off and landing aircraft.

* * * * *